(12) United States Patent
Zhou et al.

(10) Patent No.: US 8,319,175 B2
(45) Date of Patent: Nov. 27, 2012

(54) NANO-TIPS BASED GAS IONIZATION CHAMBER FOR NEUTRON DETECTION

(75) Inventors: Zilu Zhou, Needham, MA (US);
Markus Berheide, Medford, MA (US);
Felix Chen, Newtown, CT (US);
Bradley A. Roscoe, Ridgefield, CT (US); Joyce Wong, Pasadena, CA (US);
Martin G. Luling, Paris (FR); Olivier Philip, Ewing, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/872,355

(22) Filed: Aug. 31, 2010

(65) Prior Publication Data
US 2012/0049054 A1    Mar. 1, 2012

(51) Int. Cl.
*G01V 5/04*    (2006.01)
(52) U.S. Cl. ...................................... 250/265
(58) Field of Classification Search .......... 250/253–268, 250/269.1–269.8, 390.01–390.12
See application file for complete search history.

(56) References Cited

U.S. PATENT DOCUMENTS

| | | | |
|---|---|---|---|
| 3,614,437 A * | 10/1971 | Allemand et al. | ............. 376/153 |
| 3,621,254 A * | 11/1971 | Borkowski | ................. 250/472.1 |
| 4,044,301 A | 8/1977 | Allain et al. | ................... 324/459 |
| 4,393,307 A * | 7/1983 | Nozaki et al. | ............ 250/390.01 |
| 4,501,988 A * | 2/1985 | Mitrofanov et al. | ............ 313/93 |
| 4,633,089 A | 12/1986 | Wijangco | |
| 4,638,164 A | 1/1987 | Sonne et al. | |
| H407 H * | 1/1988 | George | .......................... 376/147 |
| 5,087,821 A | 2/1992 | Maitrejean et al. | |
| 7,002,159 B2 | 2/2006 | Lacy | |
| 7,189,430 B2 | 3/2007 | Ajayan et al. | |
| 7,629,604 B2 | 12/2009 | Veneruso et al. | |
| 7,687,981 B2 | 3/2010 | Parsapour | |
| 7,718,230 B2 | 5/2010 | Zakhidov | |
| 7,750,297 B1 | 7/2010 | Chow et al. | |
| 7,767,958 B2 | 8/2010 | Luling et al. | |
| 2003/0155530 A1 * | 8/2003 | Adnani et al. | ............. 250/491.1 |
| 2003/0213917 A1 * | 11/2003 | Menlove et al. | ......... 250/390.01 |
| 2006/0251543 A1 | 11/2006 | Koratkar et al. | |
| 2009/0014636 A1 * | 1/2009 | Luling et al. | .................. 250/256 |
| 2010/0085067 A1 | 4/2010 | Gabriel et al. | |

(Continued)

OTHER PUBLICATIONS

Sadeghian et al., "A low voltage gas ionization sensor based on sparse gold nanorods," 2007, IEEE, 2007 IEEE Sensors Conference, pp. 648-651.*

(Continued)

*Primary Examiner* — Kiho Kim

(57) ABSTRACT

Methods and devices relating to a radiation detector comprising of a gas chamber having a cathode plate and a substrate separated by a gap. An array of nano-tips deposited on the substrate that forms an anode structure for electron charge collection. An external power source in communication with the cathode plate and the substrate, wherein the external power source is capable of generating a plurality of regions and each region includes an electric field near each nano-tip of the array of the nano-tips that results in initiating a radiation induced controlled discharge of electrons and ions from at least one gas or at least one gas mixture. Finally, the plurality of regions include multiple generated electric fields near tips of the array of nano-tips such as CNTs, that communicatively create a conductive path between the cathode plate and the substrate, the radiation detector is capable of determining at least one radiation property.

40 Claims, 19 Drawing Sheets

U.S. PATENT DOCUMENTS

2010/0187431 A1* 7/2010 Friedman et al. ............. 250/375
2011/0163242 A1* 7/2011 Mao et al. ................ 250/390.01
2011/0169492 A1 7/2011 Groves

OTHER PUBLICATIONS

Kermany et al., "Ionization-based gas sensor using aligned MWCNTs Array," Aug. 16, 2010, IEEE ICSE Proc. 2010, Melaka Malaysia, pp. 272-274.*

Modi et al., "Miniaturized gas ionization sensors using carbon nanotubes," Nature, Jul. 2003, vol. 424: pp. 171-174.

Rosen et al., "Application of carbon nanotubes as electrodes in gas discharge tubes," Applied Physics Letters, Mar. 2000, vol. 76(13): pp. 1668-1670.

Charpak et al., the Gas Detectors Development Group at CERN, Geneva, Switzerland, available before Aug. 31, 2010, pp. 1-2, <http://gdd.web.cern.ch/GDD/>.

Calderon-Colon et al., "A carbon nanotube field emission cathode with high current density and long-term stability," Nanotechnology, 2009, vol. 20: pp. 1-5.

Seelaboyina et al., "Enhanced field emission from aligned multistage carbon nanotube emitter arrays," Nanotechnology, 2008, vol. 19: 1-4.

Mcgregor et al., "Perforated diode neutron detector modules fabricated from high-purity silicon," Radiation Physics and Chemistry, 2009, vol. 78: pp. 874-881.

William R. Leo, "Techniques for Nuclear and Particle Physics Experiments A How-to Approach," Springer-Verlag, New York, 1987, Chapter 6: pp. 119-120.

F. William Walker et al., "Chart of the Nuclides," Thirteenth Edition, General Electric Company, 1983, San Jose: pp. 22-23.

Thomas M. Babinec et al., "A diamond nanowire single-photon source," Nature Nanotechnology, Mar. 2010, vol. 5: pp. 195-199.

International Search Report and Written Opinion of PCT Application Serial No. PCT/US2011/037137 dated Jan. 12, 2012.

Becker et al., the MIT-LNS Gas Detectors R & D Group, 2011: pp. 1-2, <http://www.cyclo.mit.edu/drift/www/>.

Charpak et al., "The Use of Multiwire Proportional Counters to Select and Localize Charged Particles," Nuclear Instruments and Methods, 1968, vol. 62: pp. 262-268.

Krishna, "Factors Effecting Field Emission from Mutliwalled Carbon Nanotubes," Thesis, Louisiana State University, Jul. 2005: pp. 1-121.

Sauli, "Principles of Operation of Multiwire Proportional and Drift Chambers," Academic Training Programme of CERN, CERN European Organization for Nuclear Research, May 1977: pp. 1-92.

Toki, "Review of Straw Chambers," 5th International Conference of Instrumentation for Colliding Beam Physics, SLAC-PUB-5232, Mar. 1990: pp. 1-16.

Zhou et al., "Performance of a compact detector package for the out-of-plane spectrometer system," Nuclear Instruments and Methods in Physics Research A, 2002, vol. 487: pp. 365-380.

* cited by examiner

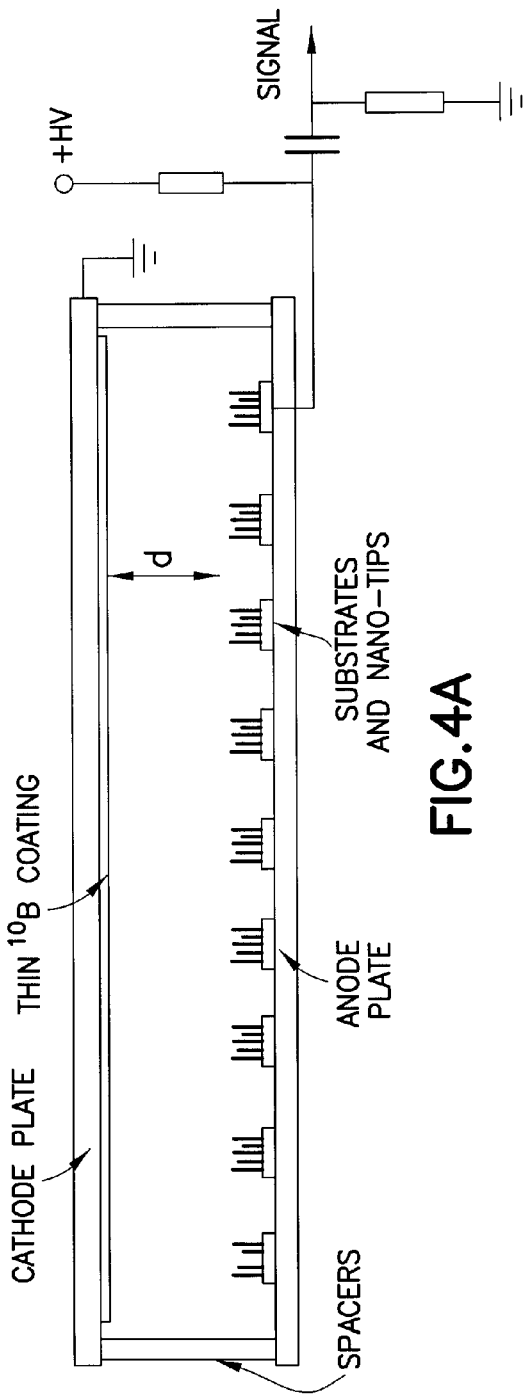
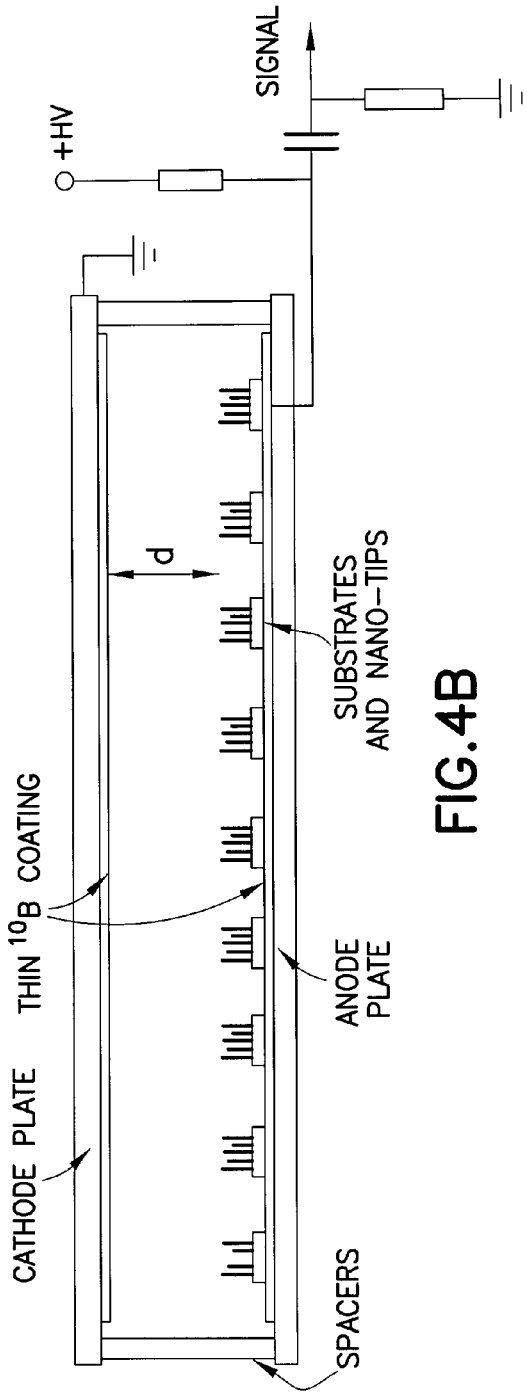
FIG.4A
FIG.4B

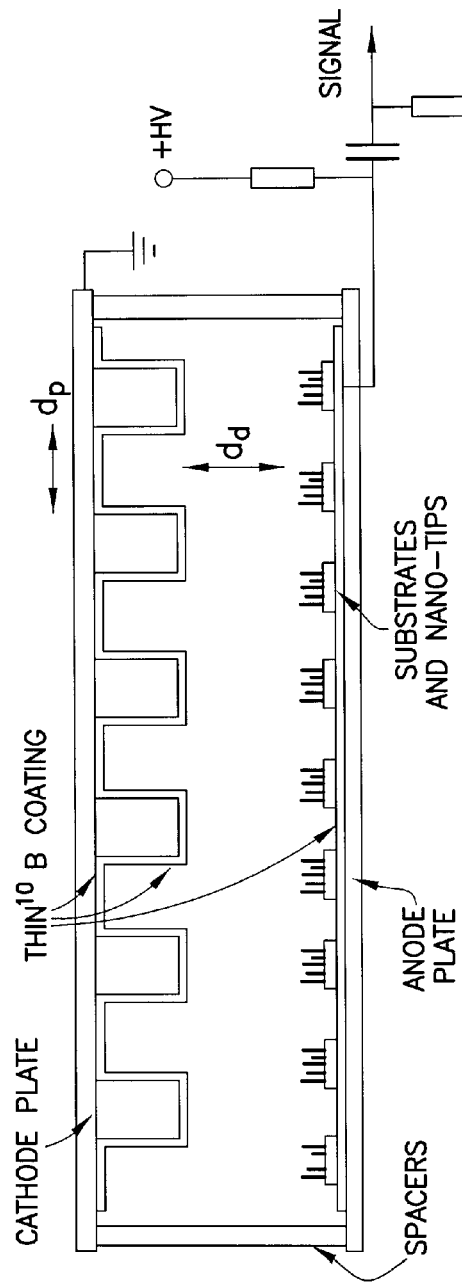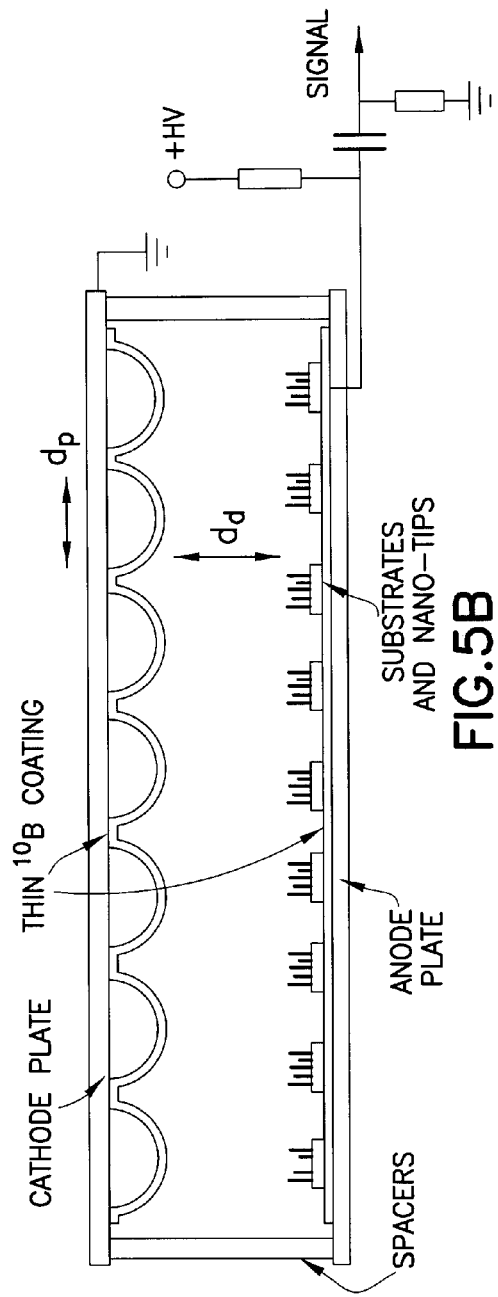
FIG.5A
FIG.5B

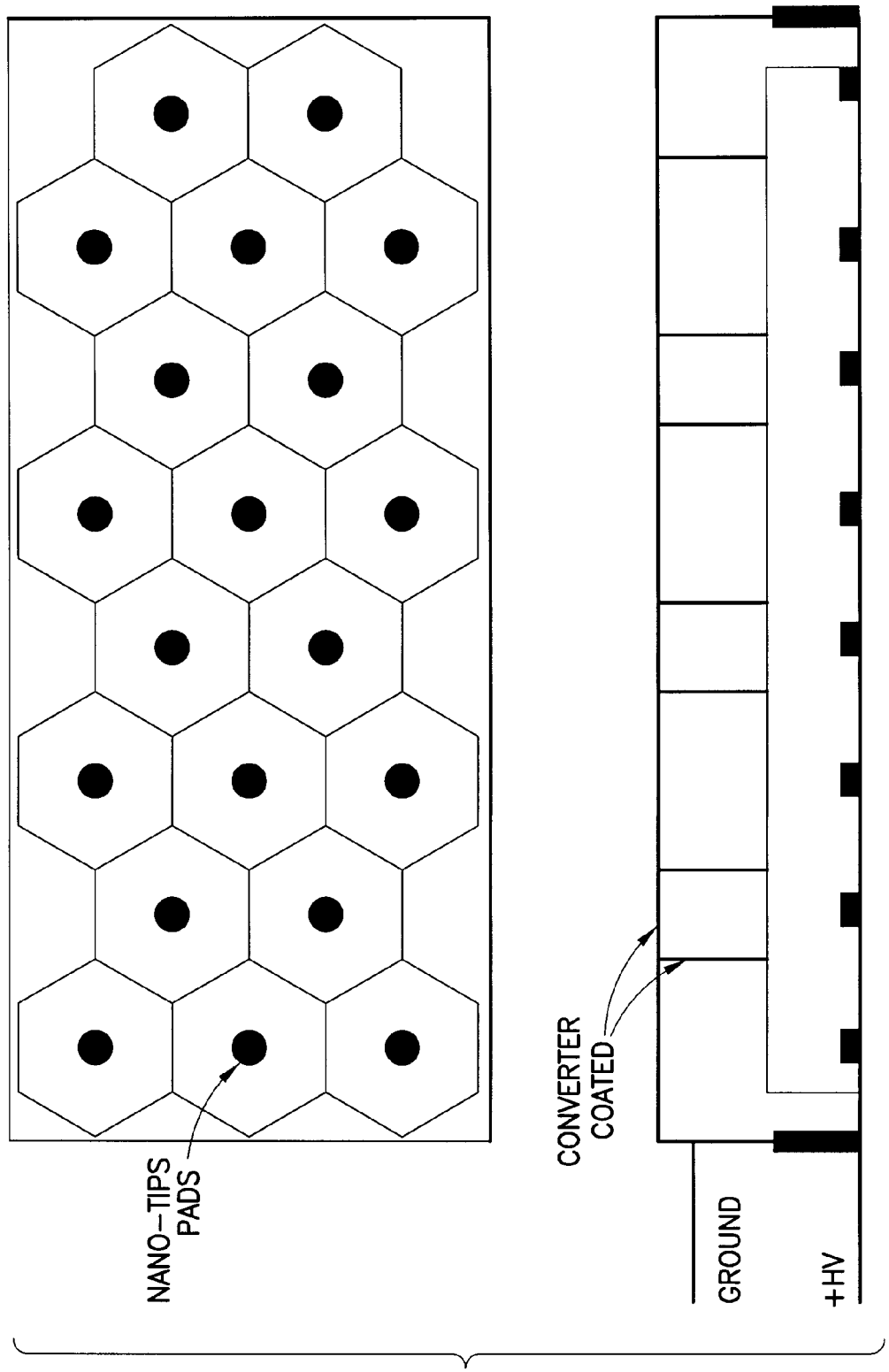

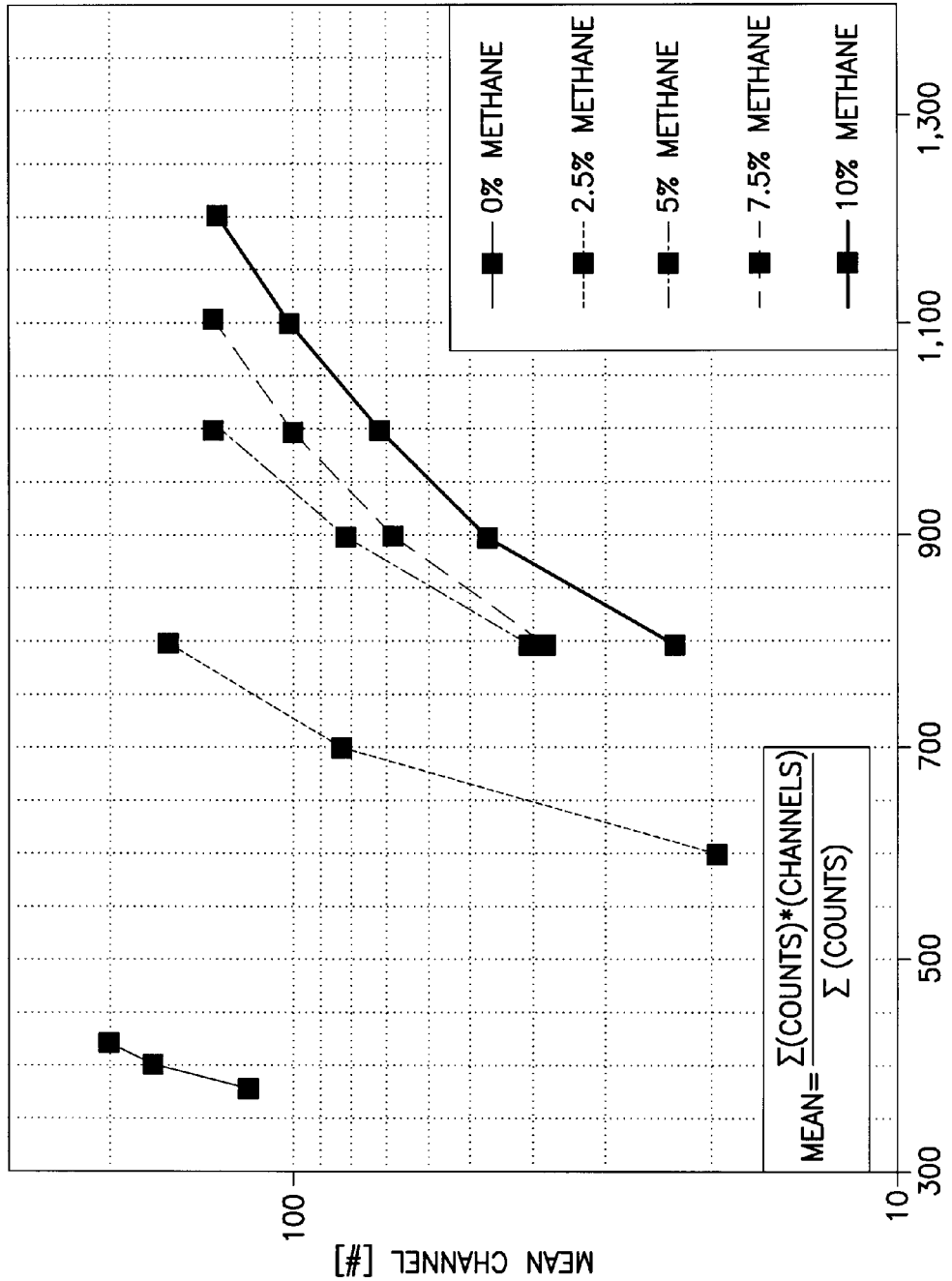

| REACTION | Q VALUE [MeV] | CROSS SECTION AT RT [BARN] | COATING THICKNESS [μm] |
|---|---|---|---|
| $^3He+n \rightarrow {}^3H+{}^1H$ | 0.764 | 5330 | |
| $^{10}B+n \rightarrow {}^7Li(*)+{}^4He$ | 2.792 (OR 2.310) | 3838 | 0.5–5.0 |
| $^6Li+n \rightarrow {}^3H+{}^4He$ | 4.78 | 941 | 3.0–50 |
| $^{157}Gd+n \rightarrow \gamma+\beta+...$ | β WITH 29–181 keV | 225000 (49000 FOR NATURAL Gd) | 1.0–50 |

FIG.14

NANO-TIPS BASED GAS IONIZATION CHAMBER FOR NEUTRON DETECTION

BACKGROUND

1. Field

This patent specification relates generally to radiation detection using nanotechnology. More particularly, this patent specification relates to methods and devices for determining at least one radiation property using an array of nano-tips, such as carbon nano-tubes (CNT), nano-wires, other types of field emitter array (FEA) or other types of local electric field enhancement arrays.

2. Background

Gas proportional chamber technology comprises a variety of different devices ranging from single-wire proportional counters, multi-layered multi-wire proportional chamber telescopes and multi-wire drift chambers. Applications span from simple radiation measurements, to neutron detection and charged particle tracking. They are used in almost every fundamental nuclear and particle physics research experiments, and widely used in industrial applications for radiation measurements.

For example, a gas proportional chamber filled with $^3$He gas is an efficient neutron detector due to the high neutron capture cross section of $^3$He. The typical proportional chamber consists of a hollow metallic cylinder that serves as the cathode, and a thin anode wire in the centre. The reaction products—a proton and a triton—are fast charged particles that ionize the $^3$He gas to produce electrons and ions. The electrons drift toward the anode wire under the influence of a guiding electric field which varies inversely with the radial distance from the wire. If the guiding electric field is above a critical value, the electrons will generate a small avalanche before reaching the anode wire. The critical value is usually achieved close to the wire due to the high electrical field in the vicinity of the thin wire. The avalanche amplifies the signal of the primary electron ion pairs generated by the charged reaction products. The size of the avalanche and the overall amplification depend on the electric field near the wire and the gas pressure. The avalanche process is illustrated in FIG. 1A, 1B, 1C and 1D. The gas pressure can be quite high in order to increase both the neutron detection efficiency and the stopping power for the reaction products before they reach the side walls. However, high gas pressure leads to slower electron and ion drifting velocities and limits the high counting rate capability of the device. The high pressure may also lead to other undesirable side effects such as high electron and ion recombination and neutron scattering, which may result in the neutron sensitivity not being a linear function of the pressure.

Another disadvantage to using $^3$He in a neutron counting tube is the supply-and-demand issue. $^3$He is becoming more expensive due to a huge increase in demand combined with a reduced supply. Because of those issues, alternative neutron detector technologies that do not require $^3$He gas are desirable. However, many proposed approaches have limitations for downhole applications in terms of implementation, efficiency, and measurement response. It should also be noted that a desirable solution must address the needs of existing tools in terms of detector space available and detector response.

Conventional gas chambers for example cannot be easily used for oil and gas applications, since the thin wires used in the gas chambers typically have a tiny diameter and have a large length ranging up to several meters depending on the applications and are normally stressed with a tension resulting in a very fragile and easily breakable structure. Further, the gas chamber of this type requires extreme care in construction and handling. Further still, the read out signals are prone to micro-phonic noises due to vibrations.

An alternative approach may include gas electron multipliers (GEMs) to using thin wires which require precision and tedious micro-machining and high voltages in operation, and are known for non-uniform efficiency and high-voltage break-downs (for example see Fabio Sauli, Leszek Ropelewski et al., the Gas Detectors Development Group at CERN, Geneva, Switzerland (http://gdd.web.cern.ch/GDD/)).

Therefore, there is a need for a detector that can handle very high instantaneous count rates, and still give a signal with the required signal to noise ratio.

SUMMARY

According to embodiments of the subject matter disclosed, a radiation detector comprises of one or more gas chamber, wherein each gas chamber includes a cathode plate and a substrate separated by a gap. An array of nano-tips deposited on a portion of the substrate forms an anode structure for electron charge collection. An external power source in communication with the cathode plate and the substrate, wherein the external power source is capable of generating a plurality of regions and each region includes an electric field near each nano-tip of the array of the nano-tips that results in initiating a controlled discharge of electrons and ions from at least one gas or at least one gas mixture. Finally, the plurality of regions include multiple generated electric fields near tips of the array of nano-tips such as CNTs, that communicatively create a conductive path between the cathode plate and the substrate, the radiation detector is capable of determining at least one radiation property.

According to some aspects of the subject matter disclosed, the radiation detector within the radiation particles induces ionization in the at least one gas or gas mixture so as to have a radiation induced controlled discharge of electrons and ions. Further, the electric field can be utilized to guide ionization electron (ion) drifting towards the anode (cathode) or portion of the anode (cathode) for one or more readout signal. Further still, the electric field near each nano-tip of the array of the nano-tips can be utilized to guide electron drifting and to create an arrangement of an electron avalanche to assists in the conductive path between the cathode plate and the substrate, so as to produce the discharge of electrons and ions from at least one gas or at least one gas mixture. It is possible the electrical field near the array of nano-tips is sufficient to create one of: more than a factor of X amplification, where X is within a range of 3 to 100 or more through the discharge of electrons and ions such as an electron avalanche for one or more readout signal; or orders of magnitude through the discharge of electrons an ions such as an electron avalanche for one or more readout signal. Further, the array of nano-tips can be disposed over substantially an entire surface of the substrate. Further still, the array of nano-tips can be disposed on the portion of the anode plate in a pattern, the pattern is from the group consisting of a serpentine circuit, a geometric design, a non-geometric design, a uniform design, a non-uniform design or some combination thereof.

According to some aspects of the subject matter disclosed, the array of nano-tips can be from the group consisting of one of: carbon nanotubes, single walled CNTs; multi-walled carbon nano-tubes (MWNTs); bundled or aligned CNTs; staged nano-tubes on top of MWNTs; shaped nano-wires; nano-structures such as nano-grass; micro-machined micro-tips from semi-conductor such as silicon, germanium; chemically etched micro-tips from semi-conductor such as silicon, germanium; wide-band gap materials such as diamond along with metal coatings applied to the one or more gas chamber to enhance conductivity; or micro-tips attached with natural formed structures such as diamondoids. Further, the array of nano-tips can be from the group consisting of one of: a field emitter array (FEA), a point-like structure that enhances a local electric field suitable for initiating avalanches that is positively biased or a point-like structure that enhances a local electric field suitable for initiating avalanches that is for field emissions that is negatively biased. It is possible the array of nano-tips can be geometrically placed within the one or more gas chamber similarly as wires of a traditional wire chamber are geometrical placed. Further, each discharge of electrons and ions produce one or more amplified signal readout that is recorded by at least one processor in communication with the one or more gas chamber and the external power source. Further still, for each discharge of electrons and ions produce one or more amplified signal readout, the one or more amplified signal readout provides a position information for one or more particle being detected.

According to some aspects of the subject matter disclosed, the radiation device can include an electric charge measuring device in communication with the cathode and substrate and capable of monitoring an amount of electric charge. Further, the radiation detector can have a width from about 100 μm to approximately 3 meters or more and a length from about 2 mm to approximately 3 meters or more. Further still, the one or more gas chamber and radiation detector may have a shape from the group consisting of one of a geometric shape such as a cylindrical shape, a non-geometric shape, a uniform shape, a non-uniform shape, a wave-like shape or a fan-like shape. It is possible one or more gas chamber can be one of pressurized, non-pressurized or depressurized. Further, the pressure or depressurization within the one or more gas chamber may be controllable. It is noted that the one or more gas chamber can be filled with one of at least one gas or a gas mixture that is one of a controllable pressure, a controllable depressurization or at an ambient pressure. Further still, the one or more gas chamber can have one or more operational regions. It is possible that each operational region of the one or more operational region includes one of at least one pressure, at least one gas, a gas mixture or some combination thereof that fills the operational region. Wherein the one or more operational region may include two or more operational regions, each operational region has one of a different pressure, a different gas, a different gas mixture or some combination thereof filling the operational region.

According to some aspects of the subject matter disclosed, the cathode plate can have a material that is an electric conducting material. Further, the anode plate can have a material from the group consisting of one of conducting materials, non-conductive or both. Further still, the gap distance between the cathode plate and the anode plate can be from approximately 100 μm to approximately 10 cm. It is possible the cathode plate and the anode plate can be separated by one or more spacer by an approximate length from 100 μm to approximately 10 cm. It is noted the external power source can be controllable, such that the controlled voltage provides for a uniform electric field or a non-uniform electric field.

According to some aspects of the subject matter disclosed, a gas converter can be applied to a portion of the one or more gas chamber for the optimization for neutron detection. Further, a portion of the one or more chamber can contain at least one layer having one of gadolinium or gadolinium isotopes such as 157 or 155 ($^{157}Gd$, $^{155}Gd$) with an approximate thickness from about 1 μm to approximately 40 μm for the optimization for neutron detection. Further, at least one coating may be applied to a portion of the one or more gas chamber for the optimization for neutron detection. Further still, the radiation detector may further comprise of at least one coating applied to a portion of the cathode plate for the optimization for neutron detection. Wherein the radiation detector can further comprise of at least one coating applied to a portion of the anode plate for the optimization for neutron detection.

According to some aspects of the subject matter disclosed, the radiation detector can include one or more three-dimensional structured surface, the one or more three-dimensional structured surface can be from the group consisting of: a periodic structure, a lattice structure, a structure used in catalysts, a structure used in air-duct filters, a honeycomb structure or other like structures. Further still, the one or more gas chamber can be coated with a neutron converting material and structured with a surface to volume ratio resulting in a neutron detector having a higher neutron detection efficiency over a comparable surface to volume ratio of a known pressurized wire tube. It is possible that at least one coating may contain one of boron or boron enriched in the boron-10 isotope ($^{10}B$), and the at least one coating has a thickness from about 0.5 μm to approximately 5 μm. Further, the at least one coating contains one of lithium or lithium ($^{6}Li$) isotope, and the at least one coating has a thickness from about 3 μm to approximately 50 μm. Also, it is conceived that $^{113}Cd$ could be used according to aspects of the subject matter disclosed within the application. Further still, the at least one radiation property may include one of detecting radiation, detecting a location of the radiation or detecting a type of radiation.

According to embodiments of the subject matter disclosed, an oil and gas field application radiation detector comprises of one or more chamber, wherein each chamber includes a cathode plate and a substrate separated by a gap. An array of nano-tips deposited on a portion of the substrate forms an anode structure for electron charge collection. An external power source in communication with the cathode plate and the substrate, wherein the external power source is capable of generating a plurality of regions, each region includes an electric field near each tip of the array of the nano-tips that results in initiating a radiation induced controlled discharge of electrons and ions from at least one gas or at least one gas mixture. Wherein the plurality of regions having multiple generated electric fields near tips of the array of nano-tips, communicatively create a conductive path between the cathode plate and the substrate, the oil and gas field application radiation detector is capable of determining at least one radiation property.

According to embodiments of the subject matter disclosed, a portable radiation detector comprises of one or more chamber, wherein each chamber includes a cathode plate and a anode plate separated by a gap. An array of nano-tips deposited on a portion of the anode plate forms an anode structure for electron charge collection. An external power source in communication with the cathode plate and the anode plate, wherein the external power source is capable of generating a plurality of regions, each region includes an electric field near each tip of the array of the nano-tips that results in initiating a radiation induced controlled discharge of electrons and ions from at least one gas or at least one gas mixture. Such that the plurality of regions have multiple generated electric fields near tips of the array of nano-tips, communicatively create a conductive path between the cathode plate and the anode plate, the portable radiation detector is capable of determining at least one radiation property.

According to embodiments of the subject matter disclosed, a movable radiation detector structured and arranged for operation in one of subterranean environment, above ground environment, wellsite environment or downhole environment for oil and gas field applications comprises a cathode plate and a substrate separated by a gap. An array of nano-tips deposited on a portion of the substrate forms an anode structure for electron charge collection. An external power source in communication with the cathode plate and the substrate, wherein the external power source is capable of generating a plurality of regions, each region includes an electric field near each tip of the array of the nano-tips that results in initiating a radiation induced controlled discharge of electrons and ions from at least one gas or at least one gas mixture. Wherein the plurality of regions having multiple generated electric fields near tips of the array of nano-tips, communicatively create a conductive path between the cathode plate and the substrate, the radiation detector is capable of determining at least one radiation property while in one of a subterranean environment, above ground environment, wellsite environment or downhole environment.

According to embodiments of the subject matter disclosed, a neutron radiation detector structured and arranged for operation in one of subterranean environments, wellsite environments or downhole environments for oil and gas field applications comprising a cathode plate and a substrate separated by a gap. Wherein at least one coating contains at least one boron isotope (preferably highly enriched in $^{10}B$) or at least one coating contains a lithium-6 isotope (preferably highly enriched in $^{6}Li$) or at least one of the gadolinium isotopes (Gd) is applied to a portion of the cathode plate for the optimization for neutron detection. An array of nano-tips deposited on a portion of the substrate forms an anode structure for electron charge collection. An external power source in communication with the cathode plate and the substrate, wherein the external power source is capable of generating a plurality of regions, each region includes an electric field near each tip of the array of the nano-tips that results in initiating a controlled discharge of electrons and ions from at least one gas or at least one gas mixture. Wherein the plurality of regions having multiple generated electric fields near tips of the array of nano-tips, communicatively create a conductive path between the cathode plate and the substrate, the radiation detector is capable of determining at least one radiation property while in one of a subterranean environment, wellsite environment or downhole environment.

According to embodiments of the subject matter disclosed, a portable neutron radiation detector comprising one or more chamber, wherein each chamber includes a cathode plate and a anode plate separated by a gap. At least one coating or at least one thin sheet is applied to a portion of the cathode plate for the optimization for neutron detection. An array of nano-tips deposited on a portion of the anode plate forms an anode structure for electron charge collection. An external power source in communication with the cathode plate and the anode plate, wherein the external power source is capable of generating a plurality of regions, each region includes an electric field near each tip of the array of the nano-tips that results in initiating a controlled discharge of electrons and ions from at least one gas or at least one gas mixture. Wherein the plurality of regions having multiple generated electric fields near tips of the array of nano-tips, communicatively create a conductive path between the cathode plate and the anode plate, the portable radiation detector is capable of determining at least one radiation property.

According to embodiments of the subject matter disclosed, an oil and gas field application neutron radiation detector comprising one or more chamber, wherein each chamber includes a cathode plate and a substrate separated by a gap. At least one coating or at least one thin sheet is applied to a portion of the cathode plate for the optimization for neutron detection. An array of nano-tips deposited on a portion of the substrate forms an anode structure for electron charge collection. An external power source in communication with the cathode plate and the substrate, wherein the external power source is capable of generating a plurality of regions, each region includes an electric field near each tip of the array of the nano-tips that results in initiating a controlled discharge of electrons and ions from at least one gas or at least one gas mixture. Wherein the plurality of regions having multiple generated electric fields near tips of the array of nano-tips, communicatively create a conductive path between the cathode plate and the substrate, the oil and gas field application neutron radiation detector is capable of determining at least one radiation property.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1B illustrates the principle of a gas chamber known within the prior art, wherein the plot of an electrical field (E-field) as function of r around a thin anode (wire) with a radius of a;

FIG. 4A illustrates another embodiment of a nano-tips based gas chamber for ionization charged particle detection with the addition of a neutron convertor coating on the cathode plate wherein the coating is for example but not limited to a thin (~1 to a few μm) $^{10}B$ for neutron detection, according to some embodiments;

FIG. 4B illustrates another embodiment of the nano-tips based gas chamber for ionization charged particle detection wherein the neutron convertor coating is on the cathode plate and on the anode plate, according to some embodiments;

FIG. 5A illustrates another embodiment of a nano-tips based gas chamber that is a modified design from FIG. 4A, having surface enhancing structures on the cathode plate to enhance the coating area, e.g., groves, pillars, etc. with a dimension scale $d_p$, wherein the neutron convertor coating is on the cathode plate, the anode plate and the structures, according to some embodiments;

FIG. 5B illustrates another embodiment of a nano-tips based gas chamber that is a modified design from FIG. 4A, having surface enhancing structures on the cathode plate to enhance the coating area, e.g., periodical wavelike or folded structures with a dimension scale $d_p$, etc., wherein the neutron convertor coating is on the cathode plate, the anode plate and the periodical structures, according to some embodiments;

FIG. 7 illustrates another embodiment of a gas chamber, wherein the gas chamber includes compartments that are complementing the nano-tips patterns such as in a honey-comb structure or honey-cone like 3D shaped structure to enhance the surface area for neutron convertor coating, or thin body volume for neutron convertor doping, according to some embodiments;

FIG. 10A is a plot illustrating not only the gain but also the so called "quenching" effects of ployatomic gas on the size of avalanches, i.e., the read-out pulse heights as processed by a multi-channel pulse height analyzer (MCA), wherein the chamber is flowing with an argon gas mixed with different percentages of methane ranging from 0% to 10% and the anode is biased with various voltages for detecting β particles from a $^{90}Sr$ source, according to some embodiments;

FIG. 14 shows in a table a few commonly used neutron converting materials, along with their neutron reaction cross-sections, by-products, and effective thickness if in the form of coating, according to some embodiments.

DETAILED DESCRIPTION OF THE PREFERRED EMBODIMENTS

Figure 1A:
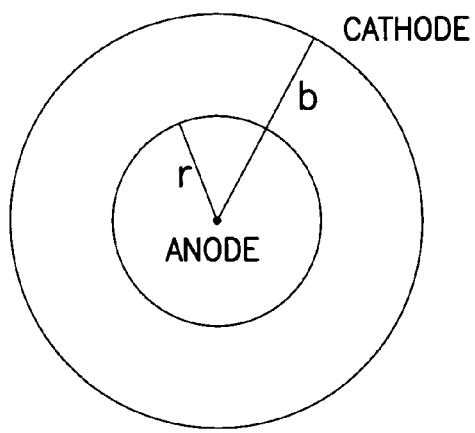
FIG. 1A illustrates the principle of a gas chamber known within the prior art, wherein the gas chamber has a coaxial cylindrical cathode with a radius of b, along with a thin anode (wire) having a radius of a, and an arbitrary location having a radius of r.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It is being understood that various changes may be made in the function and arrangement of elements without departing from the spirit and scope of the subject matter disclosed as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

It is understood that the term nano-tips and nano-tips based chambers used in this Specification can be substituted to include any suitable nano- or micro-structures that enhance the local electric fields, for example, single walled CNTs or multi-walled carbon nano-tubes (MWNTs), bundled or aligned CNTs, staged nano-tubes on top of MWNTs, various shaped nano-wires, nano-structures sometimes referred to as nano-grass, micro-machined or chemically etched micro-tips from semiconductors such as silicon, germanium, or wide-band gap materials such as diamond, or often with metal coatings to the structures to enhance the conductivity, micro-tips attached with natural formed structures such as diamondoids etc., or generally any Field Emitting Arrays (FEA) not for the purpose of field emission, but positively biased for initiating avalanches.

According to embodiments of the subject matter disclosed, a radiation detector comprises of one or more gas chamber, wherein each gas chamber includes a cathode plate and a substrate separated by a gap. An array of nano-tips deposited on a portion of the substrate forms an anode structure for electron charge collection. An external power source in communication with the cathode plate and the substrate, wherein the external power source is capable of generating a plurality of regions and each region includes an electric field near each nano-tip of the array of the nano-tips that results in initiating a radiation induced controlled discharge of electrons and ions from at least one gas or at least one gas mixture. Finally, the plurality of regions include multiple generated electric fields near tips of the array of nano-tips such as CNTs, that communicatively create a conductive path between the cathode plate and the substrate, the radiation detector is capable of determining at least one radiation property. According to an aspect of the subject matter disclosed, it is noted that the radiation detector within the radiation particles induces ionization in the at least one gas or gas mixture so as to have a radiation induced controlled discharge of electrons and ions.

Principle of Gas Chamber in View of the Embodiments

Figure 1B:
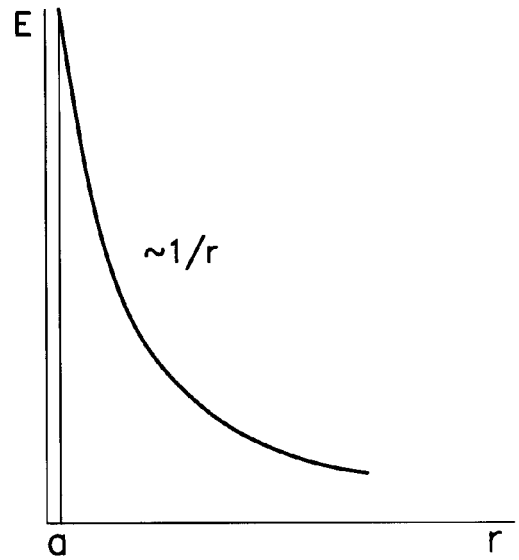
Figure 1C:
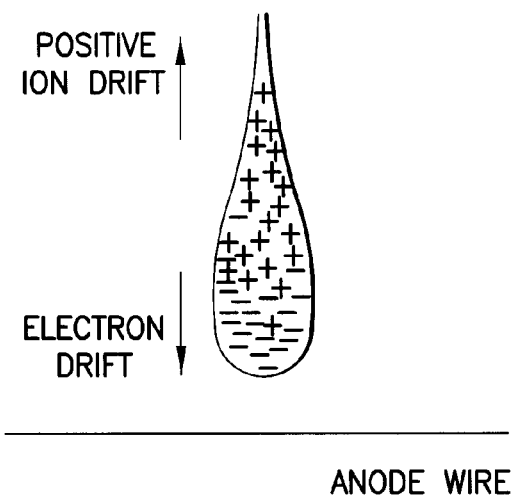
FIG. 1C illustrates the principle of a gas chamber known within the prior art, wherein a microscopic avalanche formation approximate the thin anode (wire) is where the E-field is extremely high, since the electrons are more mobile than the positive ions, the outline of the avalanche takes on a distorted shape with the electrons at one end and being collected at the anode in a very short time; the cloud of positive ions is remaining, slowly migrating towards the cathode.

FIGS. 1A, 1B and 1C illustrate the principle of a gas chamber. FIG. 1A shows a chamber with conducting walls, e.g., a cathode, filled with a gas (not shown), usually a noble gas such as argon mixed with a small fraction of polyatomic gas such as methane. We refer details to a given textbook such as by W. R. Leo, Techniques for Nuclear and Particle Physics Experiments, Chapter 6, Page 119, Springer-Verlag Berlin Heidelberg, 1987. Along its axis is suspended a conducting wire, e.g., an anode, to which a positive, +V, relative to the walls is applied (not shown). The conducting walls or the coaxial cylindrical gas chamber has a radius of b while the anode a tiny radius of a (not shown). Thus, the electrical field for an arbitrary circle inside the chamber with a radius of r can be given by:

$$E = \left( \frac{1}{\ln(b/a)} \times \frac{V}{r} \right) \qquad \text{Eq. 1}$$

FIG. 1B shows a plot of the electrical field (E) as a function of r from a region around a thin anode wire with a radius of a to the cathode with a radius of b (not shown). The E-field at a long distance provides a slowly varying guide-field for ionization charge drifts while the rapid enhancement near the thin anode wire region for creating avalanches is due to its proportionality to V/r.

FIG. 1C illustrates the microscopic avalanche formation in the neighbourhood of the thin wire where the E-field is extremely high. Since the electrons are more mobile than the positive ions, the avalanche takes on a distorted shape with the electrons at one end and being collected at the anode in a very short time. The cloud of positive ions is left behind and migrates slowly towards the cathode (also see FIG. 1A).

Figure 1D:
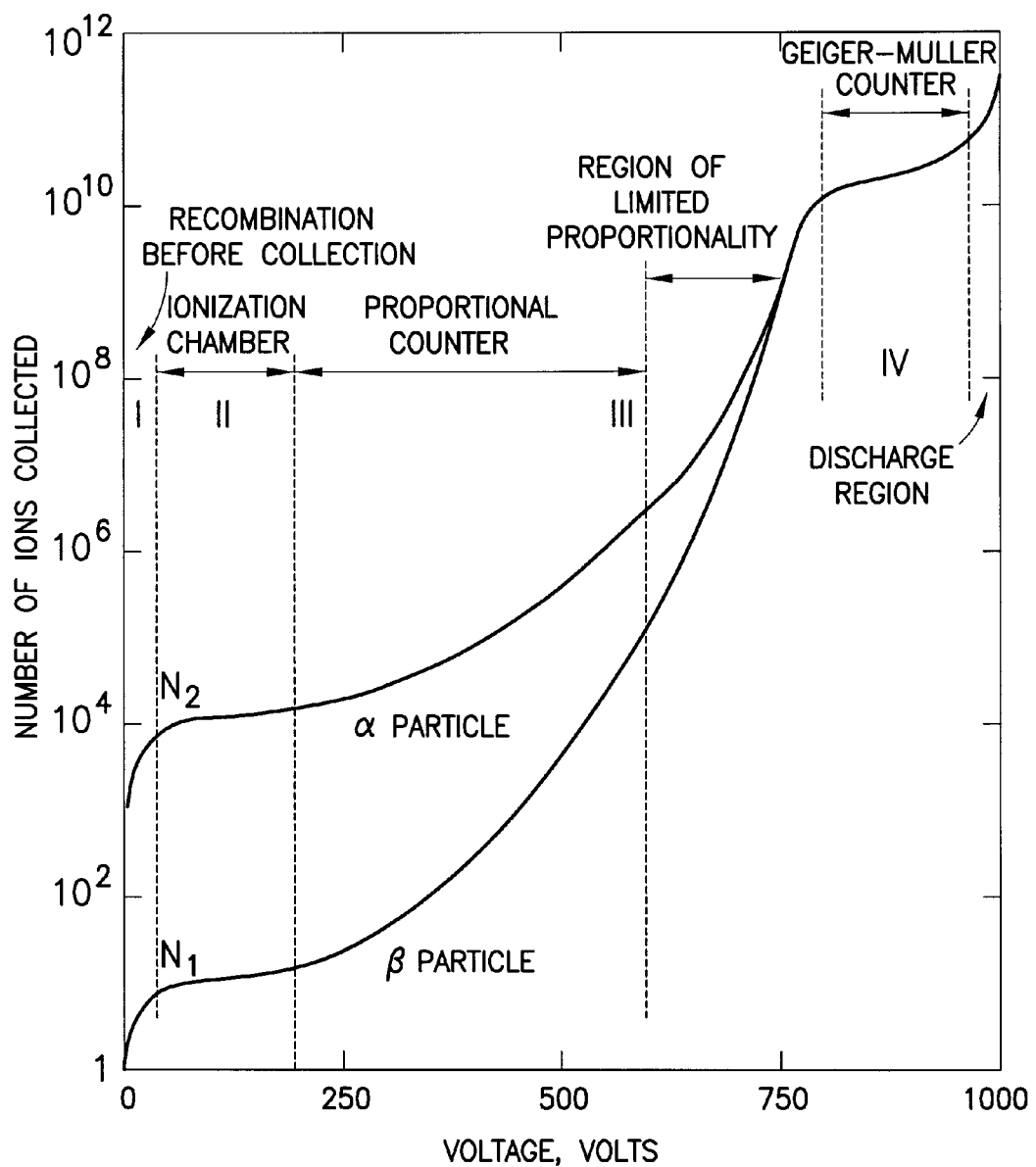
FIG. 1D illustrates the principle of a gas chamber known within the prior art, wherein a plot illustrating gain-voltage characteristics for a single wire gas chamber is shown, along with the different regions of operation.

FIG. 1D shows the traditional gain-voltage characteristics for a single wire gas chamber, in particular, the gain-voltage characteristics of the different regions of operation for charged particle detection. Again, we refer to a detailed description in a given textbook such as by W. R. Leo, Techniques for Nuclear and Particle Physics Experiments, Chapter 6, Page 119, Springer-Verlag Berlin Heidelberg, 1987. The two curves represent two typical situations: heavily ionizing α particles and "minimally" ionizing β particles with resulted gains in the different regions of operation.

Similar to the principle of a traditional gas chamber described above, FIG. 2A shows a chamber with a conducting cathode plate, and an anode plate where nano-tips structure is embedded with a conductive substrate, separated by a gap distance d, filled with a similar gas or gas mixture (not shown). In the same way, the nano-tips anode is applied with a positive voltage, +V, relative to the cathode plate. Then, the electrical field for almost everywhere inside the chamber except the regions close to the nano-tips is approximately constant and given by V/d, which provides a guide-field for ionization charge drifts. The local field at the nano tips is related to the voltage V that is applied across the cathode-anode gap d, by an enhancement factor $\beta$.

$$E = \beta \frac{V}{d} \qquad \text{Eq. 2}$$

Here, the enhancement in the E-field can be used for creating avalanches.

In Eq. 2, the enhancement factor $\beta$ is local geometrical dependent correction factor, and can be quantified by field emission studies. Field emission is a quantum mechanical tunnelling phenomenon. A high electric field applied changes the potential barrier that binds the electrons to the emitter surface, which gives the electrons high probability to tunnel through the barrier. The formalism for this process was worked out by Fowler and Nordheim in 1928, which is now known as a FN equation. A figure with experimental measurements of emission in the form shown in the equation as function of electric field is called an FN plot. The slope of an FN plot depends on $\beta$ and material work function. Then $\beta$ □□ is related to the FN slope which can be experimentally measured and the nano-tips material work function which is known, e.g. the CNT work function is known to be 5 eV. Based on our field emission studies with one class of CNTs, we found $\beta$ to be in the order of thousands, and moving away from the nano-tips, and in contrast the electric field across the cathode-anode gap to be quite constant as expected.

Figure 2A:
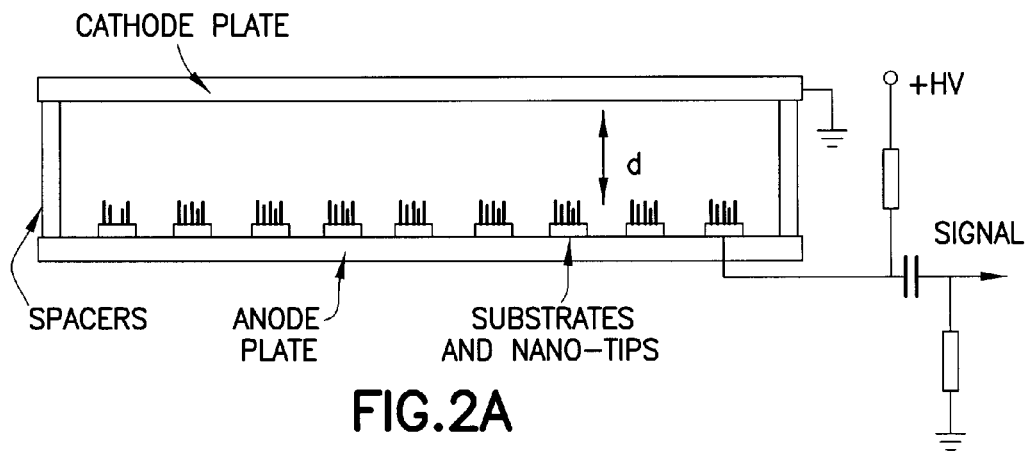
FIG. 2A illustrates a nano-tips based gas chamber for ionization charged particle detection, with a cathode plate and an anode plate separated by a distance d, and on the anode plate where the nano-tip structure are embedded, according to some embodiments.

Still referring to FIG. 2A, the number of substrates and their pitch distance and width can be easily engineered to have an efficient coverage for charge collection as well as a good position resolution when needed, while at the same time to minimize the read-out intrinsic capacitance. The read-outs can be connected per substrate for a position sensitive detection, or with substrates being chained together for a simple event counting. The spacing d between the nano-tips anode and cathode plate can be adjusted from about 100 μm or less to a few centimeters (or larger) to balance the voltage needed to provide the guiding E-field and the gas volume for ionization. The physical principles of charged particle ionization, electron-ion drifting, and avalanche formation and polyatomic gas quenching are the same as in a conventional gas chamber, as illustrated by Eq. 1 and 2 and discussions therein. Spacers can be placed periodically for the structure support if the chamber intends to cover a large area and if the plates are mechanically thin. Spacers may be part of the vacuum seal or not; in case that not a separate enclosure may be engineered for sealing the carrier gas inside the chamber. The surfaces of the cathode and anode plates are not limited to straight planes, but may for example be bended to different shapes to flexibly fit the design envelope, or be rippled, and additional grid structures can be introduced to boost the available surface areas in the case of neutron converter (e.g. boron) coatings. The carrier gas can be, but is not limited to, $^3$He, $^4$He, $BF_3$, Argon etc. or mixtures with ployatomic gases such as $CH_4$, isobutene, $CO_2$ etc. sealed inside or arranged to be continuously flowing through the chamber and can be pressurized for high detection efficiency, or depressurized to below an atmosphere pressure for minimizing the energy losses to let charged-particles punch through. The low-pressure gas fill helps the drift velocity for fast detection.

Overview

The gas chamber particle detector can be a gas ionization, proportional, drift, Geiger Müller, or discharge chamber utilizing an array of nano-tips distributed on a given anode structure to replace the wire or multi-wires as in a conventional gas chambers for detecting, selecting and/or locating charged particles. For example, instead of thin wires in a conventional detector, the arrays of nano-tips on a given pattern of substrates are utilized to enhance the local electric field for creating avalanches at the end of ionization drifts. An appropriate external electronic circuit connected to the anode substrate register and analyse the charge collected at nano-tips.

It is noted that instead of using the arrays of nano-tips for emission, the arrays are used on the anode side for creating avalanches and collecting electrons. The lifetime of these arrays are expected to be much longer than when used as electron emitter since they are located on the anode side and not subjected to ion bombardment. However, some particular types of nano-tips may out-perform others due to structural differences, and some may degrade overtime due to Joule heating. Thus, refer to nano-tips as a generic term such that there are various forms of nano-tips, for example, already CNTs can be in forms of single-wall, multi-wall, distributed, or aligned, or aligned bundles, or staged. In general, the concept of nano-tips could include any of the following: CNTs nano-wires, nano-grass, single-wall nano-tubes or multi-wall nano-tubes (MWNT), or staged with nano-tubes on top of MWNTs, micro-machined or chemically etched micro-tips from semi-conductors such as, but not limited to, silicon, germanium, or wide-band gap materials such as diamond—which is so called diamond micro-tips, or often with metal coatings to the structures to enhance the conductivity, micro-tips attached with natural formed structures such as diamondoids etc., or generally any FEA. One may further broaden the concept to include any point-like or cone shaped structures that enhance the local electric field suitable for initiating avalanches (if positively biased) but may, or may not be sufficient for field emissions (if negatively biased).

The substrate for the nano-tips may be any of a small pad, many pads, a thin strip, many strips, time-delay line like strips, a thick wire, a thin rod, or a plate, or even a surface with an arbitrary shape etc. Further, it can be a "conductive" surface of a semi-conductor such as silicon or a metal such as aluminium, copper, molybdenum, etc. It is noted that at least one aspect depends on how large the area the anode covers and on the requirements of the read-out electronics.

Further, there can also be a variety of gas chambers, not only can there be a variety of geometries, shapes, or different gas fills with different pressures, but also there can be different operation regions. The designs may include chambers with a nano-tips array on a single substrate strip (like conventional single wire chambers), multi-substrates (a.k.a. multi-wire) chambers, G-M counters, proportional and drift chambers, straw chambers, tracking chambers, time projection chambers etc. The gas fill can be pressurized, for example up to 20 atm or more, as in conventional $^3$He tubes so to have high neutron detection efficiency, as well as to reduce the so called "wall effects"—the neutron reaction by-product charged particles to have short path length in the gas before hitting the side walls resulting a full ionization charge collection. The gas fill can be also minimized to sub atmosphere pressures in order to reduce energy losses for the punch-through charged particles when used as a tracking chamber. In addition, the low pressure fill helps the drift velocity to make it a fast detector.

Further still, the applications of nano-tips based gas chambers disclosed in this Specification are obviously not limited in use, and for example, may be used in other places where they can be very advantageous due to eliminating the thin wires in conventional chambers. This includes applications as radiation detectors, neutron counters, charged particle tracking detectors, gas detection sensors, cosmic ray detectors etc. and even as ion sources with ions originated from avalanches.

Proportional mode: Within an appropriate range of electric field strength (operating voltage), the total amount of charge collected on the anode from avalanches is proportional to the original, primary electron ion pairs created by the ionization radiation in the fill gas (hence, proportional chamber). For a given type of ionizing radiation (i.e. α, β or γ) the number of primary electron-ion pairs created is proportional to its energy loss in the gas. Thus, a proportional chamber has the ability to measure the energy of the ionizing radiation that is deposited in the fill gas. Furthermore, the number of primary electron-ion pairs and thus the size of the anode signal depends strongly on the type of radiation detected (e.g. an α particle deposits far more energy per unit length in the gas than an electron does). Thus, the device may alternatively used to distinguish the type of radiation detected.

Further, at least one advantage of the nano-tips based gas chamber is that it may more readily include structural changes in the chamber construction using micro-machining and nano-technologies. For example, conventional gas chambers with long and thin wires can now be replaced by a more robust mechanical structure such as a patterned array of nano-tips. Another significant advantage is that the nano-tips based gas chamber can be miniaturized. A miniaturized detector has many advantages, for example: it may be utilized in places where space is limited such as in oil and gas exploration applications, e.g., down-hole in an oil well, or in medical, construction and other applications with limited detector space or with an otherwise difficult to fit detector space such as curved or annular shaped space.

Another advantage can be that with a short distance between the anode and cathode, the anode to cathode voltage can be relatively low due to the large enhancement factor from the nano-tips which provides for an operational advantage, as it reduces specifications on insulation and electronics. Further, the short drift distance allows for faster signals and is therefore suitable for high counting rate applications. Such advantage can be explored even for a chamber with a relatively long drift distance by implementing a grid close to the nano-tips anode to form a triode configuration so that the electric field in the drift region and in the avalanche region can be controlled separately and for example the anode to grid voltage can be effectively reduced while the majority of ions originated from avalanches near the nano-tips can be quickly removed by the grid.

Furthermore, the chamber and its read-out can be more easily segmented, that is, one can pack many mini-chambers over a large area to obtain position information of incoming radiation. Some of the nano-tips such as CNT arrays are less expensive and more practical for covering a large area/volume than devices such as solid-state detectors, gas electron multipliers [GEM] or other similar methods.

Furthermore, the chambers and their read-outs can be more easily stacked or packed with many layers or multiple units over a given large volume for example to increase [neutron] conversion/detection efficiency in case of a neutron detector. Again, the CNT arrays are less expensive and more practical for covering a large volume than devices such as solid-state detectors, GEMs or other similar methods.

Thus, as noted above, the nano-tips based gas chambers have many uses and advantages over conventional wired gas chambers, solid-state devices, GEMs or other similar methods.

As noted earlier, one possible and desirable application of nano-tips based gas chambers is neutron detection to replace $^3$He gas chambers. For this purpose nano-tips based gas chambers can be constructed with drift cells in a sub-millimeter dimension which is even smaller than the smallest conventional wire chambers such as the so-called "straw chambers", but packaged to cover a given large volume (that is, comparable to conventional pressurized $^3$He tube), resulting in a very high overall surface to volume ratio and thus high neutron detection efficiency. A neutron converter layer, (e.g. containing isotopes of gadolinium Gd, or boron $^{10}$B, or lithium $^6$Li, or other suitable materials), coated, preferably in a thin layer, on interior walls of each mini-chamber captures neutrons, and the resulting ionizing by-products are detected. The large surface to volume ratio is an important attribute for high neutron detection efficiency since the coatings have to be thin enough for the by-product charged particles being able to come out the coating surfaces and still having sufficient energy for gas ionization. This design provides an efficient neutron detector in a size comparable to, and with performance close to, the present commercially available pressurized [approximately up to 20 atm] $^3$He tubes.

Some Embodiments

The gas chambers disclosed can be a gas ionization, proportional, drift, GM, or discharge chamber utilizing an array of nano-tips implemented on an anode structure to replace the wire or multi-wires in conventional gas ionization, proportional, drift, GM, or discharge chambers for detecting, selecting and/or locating charged particles, and the neutrons if with convertors.

FIG. 2A illustrates at least one embodiment of a nano-tips based gas chamber for ionizing radiation detection. It is noted that the nano-tips can be CNTs, or any other suitable microstructures that enhance the local electric fields. Here, CNTs are typically a few μm in length, deposited on a semi-conductor or metal substrate to form an anode structure for electron charge collection while the nano-tips are creating avalanches after electron drifting which provides the amplification of the signal as in a conventional gas chamber. The number of substrates and their pitch distance and width can be easily engineered to have an efficient coverage for charge collection as well as a good position resolution when needed, while at the same time to minimize the read-out intrinsic capacitance.

Still referring to FIG. 2A, the concept is similar to a conventional multi-wire drift chamber design, where the substrates deposited with nano-tips replace the thin wires, so that the electrical field distribution and charge collection principle are the same. The intrinsic capacitance of a two parallel plate system is given by $c=\epsilon A/d$, where A is the area of conducting surface on the plate, while d is the gap distance and $\epsilon$ the permittivity of gas in the gap. For the read-out before input to a charge-sensitive amplifier, the pulse height $V_i$ is governed by $V_i=Q/c$, where Q is the total charge collected on the substrates. Obviously, reducing the conducting surface area decreases the capacitance, and reducing the capacitance enhances the read-out pulse amplitude. The electronic read-outs can be connected to individual substrates or groups of substrates for a position sensitive detection (since each substrate and its corresponding read-out pulse can be tagged with its true position location in the system), or with all individual substrates being chained together for a simple event counting.

The spacing d between the nano-tips anode and cathode plate as shown in FIG. 2A can be adjusted from approximately 100 µm to a few centimeters to balance the voltage needed to provide the guiding electric field (E-field) and the space for ionization.

Still referring to FIG. 2A, the physical principles of gas ionization, electron-ion drifting, avalanches formation, and polyatomic gas quenching are the same as in a conventional gas chamber. As a non-limiting example, when the distance between cathode and anode is made less than 1 mm, it results not only in a compact size but also a fast speed due to the fact that less time is required for a shorter drift distance at a given drift velocity. Generally, the drift velocity of electrons is typically around 4-5 cm/µs, while the ions a factor of thousand slower for most of carrier gases or gas mixtures.

Still referring to FIG. 2A, the counting speed is dominated by how fast the ions are removed when they reach the cathode so that the space-charge effect does not limit the chamber performance for the next ionization event. Therefore, short drift distances and methods of removing ions are always preferential in a high counting rate environment. Spacers may be placed between anode and cathode for structural support if the chamber intends to cover a large area with thin anode and cathode plates. The spacers are not necessarily part of the vacuum sealing since a separate enclosure can be engineered for sealing the carrier gas inside or flowing gas through the chamber.

Still referring to FIG. 2A, there are at least two different types of nano-tips broadly covering most of CNTs, micro-tips, or FEAs. First, there is the CNT array that is distributed "randomly" and "sparsely" in an area with various lengths, see for example, X. Calderon-Colon, H. Geng, et al. "A carbon nanotube field emission cathode with high current density and long-term stability." Nanotechnology 20 (2009) 325707 and references therein. Here the CNT length ranges from 2 to 8 µm, the tips are in the order of a few nm in diameter (i.e., the aspect ratio of the tubes is in the order of thousands), and the distribution density is about a few hundred of thousands usable CNTs per square mm of area. Statistically, the average CNT distribution and its variance can be quite homogeneous over a large enough area with respect to the size of individual tubes, so that also the performance of the chamber can be homogeneous over large areas. It is noted that the self-screening effect that is the effect of overlapping electric fields of neighbouring nano-tips is less with a "sparse" distribution, since the CNTs are about a few µm (comparable to their length) distance away from each other. At least one advantage of this type of CNTs is that the electrical plating method used for CNT deposition is well known from other CNT applications. Further still, this type of CNTs can have a longer lifetime than other types of CNTs made with convention chemical vapour deposition methods, based on our field emission studies. This may, to a certain extent, attributed to less CNT body structure defects and a stronger root binding to the substrate due to the electrical plating method used for CNT deposition. Thus, it is estimated that this type of CNTs can have an instantaneous electrical current in the order of 10 µA or even 100 µA per individual nano-tube over an extended period of time without overheating.

Second, in the case of CNT arrays, they can be aligned in bundles with approximate equal lengths. See for example, Raghunandan Seelaboyina et al., Enhanced field emission from aligned multistage carbon nanotube emitter arrays, Nanotechnology 19 (2009) 065605 and references therein. The aligned bundles reduce the variability in the distribution or lengths and thus can give a homogeneous cross-board performance. In order to minimize the self-screening effect in the electrical field distribution, the aligned CNTs can be bundled with spaces in between. Alternatively, diamond micro-tips can be chemically etched or otherwise engineered to have equal lengths and a uniform distribution, with the spacing between tips that can be controlled. See for example, Thomas M. Babinec et al., A diamond nanowire single-photon source, Nature Nanotechnology, Vol. 5, 195-199 (2010) and references therein. This is a possible other way to minimize the self-screening effect and design nano-tips that have very similar performance and long lifetime.

It is, again, noted that the field of nano-tips is a broad and booming science in research and application. The concept of nano-tips includes in this Specification: single walled CNTs or multi-walled carbon nano-tubes (MWNTs), bundled or aligned CNTs, staged nano-tubes on top of MWNTs, various shaped nano-wires, nano-structures sometimes referred to as nano-grass, micro-machined or chemically etched micro-tips from semiconductors such as silicon, germanium, or wide-band gap materials such as diamond, or often with metal coatings to to enhance the conductivity of the structures, or micro-tips attached with natural formed structures such as diamondoids etc., or generally any FEA. It is far beyond the scope of this Specification to discuss them in details or compare them in performance, other than in a few examples given here. It is very natural that the field is pushed to advance by many other applications, and generically speaking, the requirements for initiating ionization avalanches in a gas chamber are less stringent than that of field emission for example.

Figure 2B:
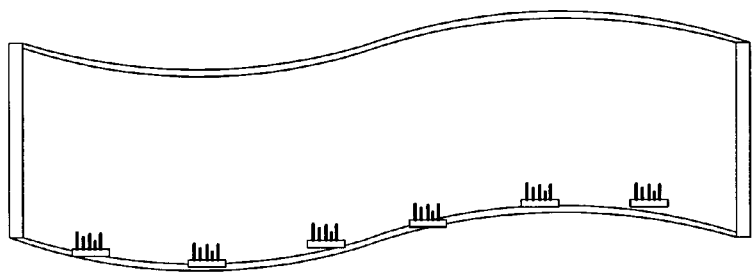
FIG. 2B is the same as in FIG. 2A, and illustrates a nano-tips based gas chamber with a arbitrarily curved shape or a section of arbitrarily curved shape, according to some embodiments.

FIG. 2B is the same as in FIG. 2A, and illustrates a nano-tips based gas chamber with a irregular or curved shape or a section of a curved shape. It is noted that the chamber can be non-uniform, uniform or have sections that are non-uniform, uniform or some combination thereof. It is also possible that the surface of the cathode plate may not be limited to a plane, but may be highly irregular, folded, rippled, grooved or the like.

Figure 2C:
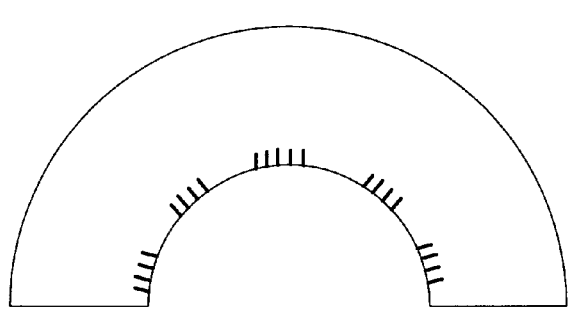
FIG. 2C is the same as in FIG. 2A, and illustrates a nano-tips based gas chamber with a annular shape (or a crescent shape) or a section of an annular shape (or crescent shape) to fit better into the side of a typical cylindrical tool geometry for oil-well service, according to some embodiments.

FIG. 2C is the same as in FIG. 2A, and shows a structural embodiment wherein a nano-tips based gas chamber has an annular shape, a crescent shape or a section of an annular or crescent shape or any similar shape that is optimized to fit into the inner diameter of a pressure housing of a cylindrical oil and gas application device (such as a cylindrical tool geometry for oil-well service tools).

Figure 2D:
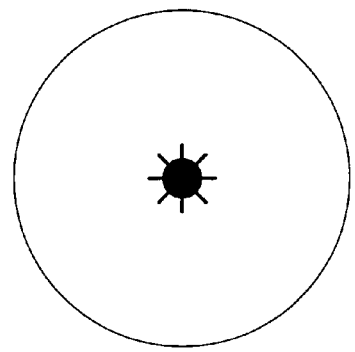
FIG. 2D is the same as in FIG. 2A, illustrates a nano-tips based gas chamber with a cylindrical geometry similar to a present $^{3}He$ tube except in the center a mechanically stronger rod is used instead of a thin wire, and an array of nano-tips such as CNTs are deposited on the surface of the rod for read-out, according to some embodiments.

FIG. 2D is the same as in FIG. 2A, and shows another structural embodiment with a nano-tips based gas chamber or so-called tube in a cylindrical geometry similar to the $^3$He tube except that in the centre a solid rod replaces the thin wire of the conventional device, such that the mechanical rod is mechanically stronger than the thin wire and the nano-tips such as CNTs are deposited on the surface of the rod for read-out. One advantage being that vibrations are much weaker with the mechanical rod than with a thin wire so that the potential micro-phonic noises in the read out signals are suppressed.

Still referring to FIGS. 2C and 2D, the nano-tips based gas chamber can be designed in many other ways, for example, it can be a flat box like the one given in FIG. 2A, a curved or irregular design as shown in FIG. 2B, or some other type of design including linear design, geometric design, non-geometric design, etc., wherein the design may be structured in such a way for convenience or for fitting into a given space. Further, several boxes or other nano-tips based gas chamber designs can be packaged together to increase the detection volume or to be used for high-energy charged particle tracking or imaging.

It is noted that there are all kinds of gas chamber designs as commonly seen with conventional gas chambers. This invention includes the same variability for nano-tips based gas chambers as well. For example, one can have the multiple nano-tips (thin) layers positioned within a large volume chamber, such that the location of the nano-tips can be positioned so as to replace the thin wire location of known conventional wire chambers used for high-energy particle tracking. It is also noted that there are all kinds of gas-chambers designs other than having parallel plates (cathode plate with an anode plate), such that the designs or patterns can vary dependent on the intended goal or specific application. For example, by varying the substrate pattern and location within the nano-tips based gas chamber, it is possible to enhance the array of nano-tips performance along with the ability to provide measurements for position sensitivity, etc. Further, varying the substrate shape and location such that the substrate surface can bring flexibility in the design, for example on plainer plates, curved plate surfaces, on rods, etc.

Figure 3:
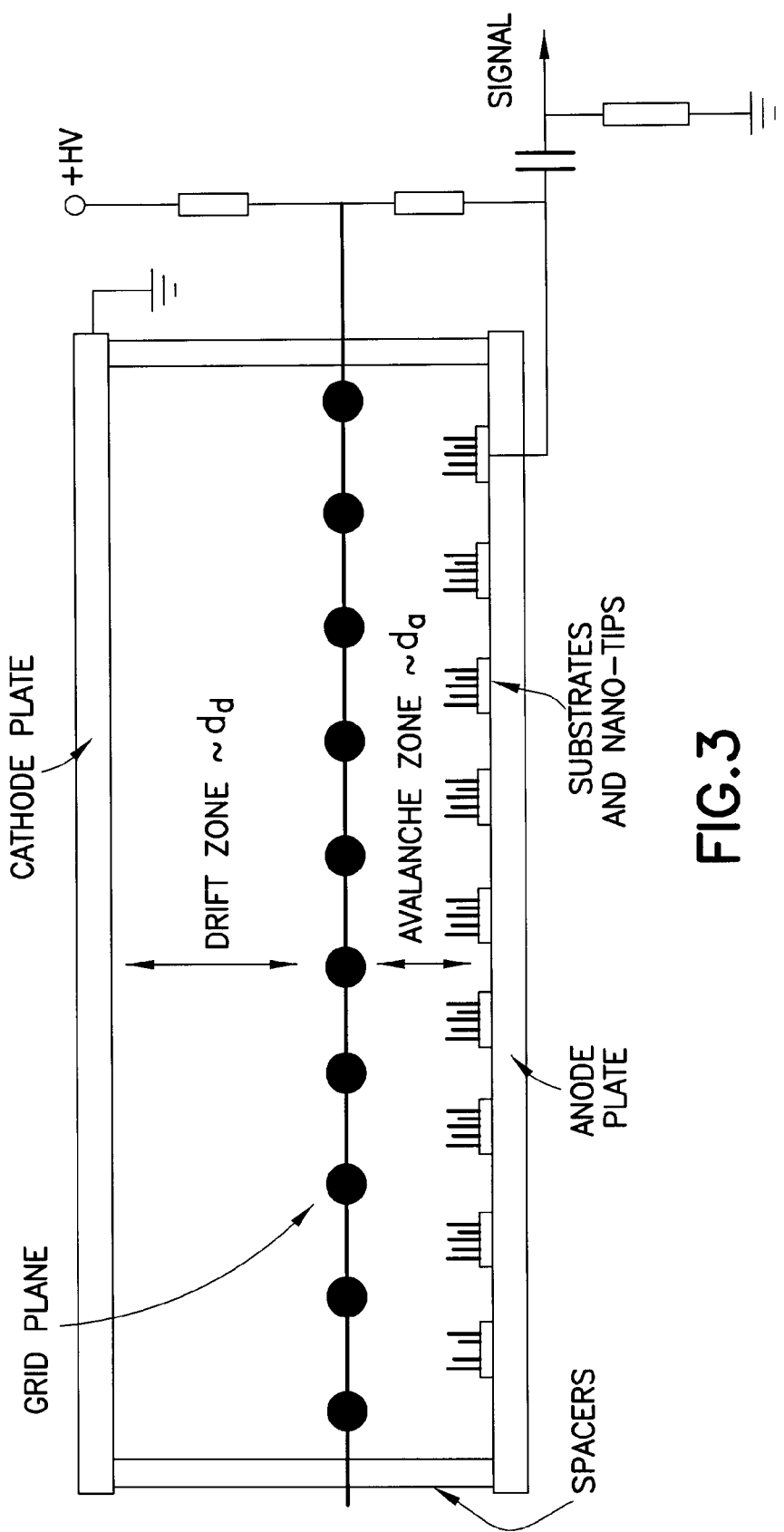
FIG. 3 illustrates another embodiment of a gas chamber that includes a triode structure with the chamber having additional grid structures/planes or sections of grid structures/planes, wherein the drift zone the drift distance $d_d$ may be increased while the dimension $d_a$ of the avalanche zone is kept relatively small, according to some embodiments.

FIG. 3 illustrates, a triode structure with the chamber having additional grid structures/planes or sections of grid structures/planes, wherein the drift zone which is separated from the avalanche zone may be increased in distance. It is noted the distance $d_a$ between grid and anode can be very close, which can provide an advantage of supplying less high voltage (HV) with respect to structures having parallel plates. By separating the drift region from the avalanche region by a grid, the voltages can be controlled separately, and thus a large drift distance $d_a$ between the cathode and grid can have a very uniform field, while the localized field between grid and anode [where the nano-tips are located] provide avalanches for amplification. The uniform field over the large drift distance can also improve the position resolution. The short distanced grid can help sweep away the back drifting ions originated from avalanches, thus resulting in a chamber with an excellent performance for a high-counting rate. By non-limiting example, the drift zone may range from about 100 μm to a few cm.

Still referring to FIGS. 2A to 3, the carrier gas can be, but is not limited to, $^3$He, $^4$He, $BF_3$, Argon etc. or mixtures with polyatomic gases and can be pressurized for high detection efficiency due to increase of the energy losses when the chamber is used for radiation detection, or depressurized to below an atmosphere pressure for minimizing the energy losses to let charged-particles punch through when the chamber is used for tracking. In addition a quenching polyatomic gas additive (for example methane) may be used in the chamber. It is noted, that several devices can be packaged together to increase the detection volume or to be used for high-energy charged particle tracking or imaging.

FIG. 4A illustrates another embodiment of a nano-tips based gas chamber for ionizing radiation detection with the addition of a neutron convertor coating on the cathode plate to optimize the chamber for neutron detection. In this embodiment the coating consist of a material containing isotopes such as, but not limited to, $^{10}$B, $^6$Li, $^{157}$Gd $^{155}$Gd, $^{113}$Cd or other neutron converter materials. In the preferred embodiment the coating is a thin, for example, about 0.5 μm to 5 μm (1 μm to 3 μm) thick of boron highly enriched in $^{10}$B (typically higher than 90% enriched). Alternatively a thin, about 3 μm to 50 μm (10 μm to 40 μm) thick layer of lithium fluoride (LiF) preferably highly enriched in the isotope $^6$Li, or a thin (micrometer range) layer of natural gadolinium or preferably Gd enriched in $^{157}$Gd is used. The array of nano-tips is as described in previous sections for example in a form of CNTs that can be a few μm in length, deposited or embedded on a semi-conductor or metal substrates to form an anode structure for electron charge collection and the nano-tips for creating avalanches at the end of electrons drifting for an amplified read-out as in a conventional gas chamber. It is possible the coating could be not exactly a coating, for example, a very thin film may be glued on another material which could be more of a composite material then a coating. It is also possible that a very thin glass with a very high boron content may be used.

In general, the nano-tips based gas chamber can be filled with gases such as $^3$He or $BF_3$, preferably enriched with $^{10}$B, directly for neutron detection just as the conventional gas chambers or gas tubes with wires and with $^3$He or $BF_3$ gas fills. The physics principle is the same. The nano-tips based $^3$He or $BF_3$ gas chambers as described in this Application have those stated advantages [in the section of overview] over the conventional ones.

Neutron scattering or capture reactions with a few neutron converter materials can be found in many nuclear science literatures as long with data on reaction cross-sections, i.e. the converting efficiencies. As for example, FIG. 14 shows a few of these converting reactions with some properties for the interests of optimizing the nano-tips gas chamber design (F. W. Walker, D. G. Miller and Dr. F. Feiner, Chart of the nuclides, 13$^{th}$ edition, General Electric Company). For example if with thin coatings of a converting material, the coating thickness should be designed or compromised with considerations of both neutron converting efficiency and the reaction by-products (charged particles) detection efficiency. The thicker the layer is, the higher the neutron converting rate while the lower the by-products detection efficiency due to too much energy loss in the coating layer so that the by-product charged particles either are stopped inside the coating material or do not have any energy left for producing sufficient ionization in the gas for detection. A good compromise is to have a proper choice of converting materials suitable for a given application and to have a reasonable thin coating layer or in a form of thin foil for the chamber design, and then stack multiple chambers for achieving high neutron detection efficiency.

Thus in this Specification, the "coating" is a general term for neutron converting. It can be a thin coating containing a large amount of boron isotopes preferably highly enriched in $^{10}$B with a thickness of about 0.5 μm to 5 (1 μm to 3 μm), or slightly thicker coating containing lithium preferably highly enriched in $^6$Li for example lithium fluoride ($^6$LiF) with a thickness of ~3 μm to ~50 μm (~10 μm to ~40 μm), or even a foil of natural Gd with a thickness of ~1 μm to ~50 μm (~10 μm to ~40 μm), or a Gd-foil enriched in $^{157}$Gd, or a foil of cadmium preferably enriched in $^{113}$Cd, or any such neutron converter material.

Furthering our discussion concerning the neutron converter, the converter layers is not limited to the cathode only. The extended geometry of the anode of a nano-tips based gas chamber vs. wire chamber allows for converter material also to be deposited on at least a fraction of the anode side, which significantly increases the efficiency of the same detector volume. For patterned anode, $^{10}$B may be deposited between the substrate pads or lines as shown in FIG. 4B, 5A, 5B, 6B, 7, 11, 12 and 13. Another embodiment may include to incorporate $^{10}$B in the binder which bonds nano-tips structures such as CNTs to the substrate, or dope $^{10}$B directly in the substrate material, or coat $^{10}$B on to the chemically-etched micro-tips, as similar to FIGS. 4B, 5A and 5B etc. but not explicitly shown. It is noted, that by varying the plates and chamber design, it is intended to either increase the surface area in case of thin coating, or to effectively increase the usable weight percentage of the neutron converting materials in the system, or different materials to enhance the neutron converting cross-section or converting neutron at different energies. It noted that the nano-tips based chamber can be designed to address many applications, wherein conventional designs would be rendered either impractical or too large in size to consider for a particular application.

FIG. 4B illustrates another embodiment of the nano-tips based gas chamber for ionization charged particle detection wherein the neutron convertor coating is on the cathode plate and on the anode plate. At least one advantage for providing the neutron convertor coating on the anode plate is to boost the available surface areas within the chamber.

FIG. 5A illustrates another embodiment of a nano-tips based gas chamber that is a modified design from FIG. 4A, having either irregular or here periodical structures on the cathode plate to enhance the coating area, e.g., groves, pillars, etc., wherein the neutron convertor coating is on the cathode plate, the anode plate and the structures. It is noted that the structure(s) provide, among other things, an increased surface area for applying the neutron converter coatings within the chamber (see also FIG. 5B). The dimension scale $d_p$ can be an order of magnitude smaller than the drift distance $d_d$ so that it would not have much of an effect on the electrical field in the gas for charge drifting.

FIG. 5B illustrates another embodiment of a nano-tips based gas chamber that is a modified design from FIG. 4A, having either irregular or here periodical structures in an average dimension scale of $d_p$ on the cathode plate to enhance the coating area, e.g., periodical wiggling structures, etc., wherein the neutron convertor coating is on the cathode plate, the anode plate and the periodical wiggling structures. The dimension scale $d_p$ can be an order of magnitude smaller than the drift distance $d_d$ so that it would not have much of an effect on the electrical field in the gas for charge drifting.

Figure 5C:
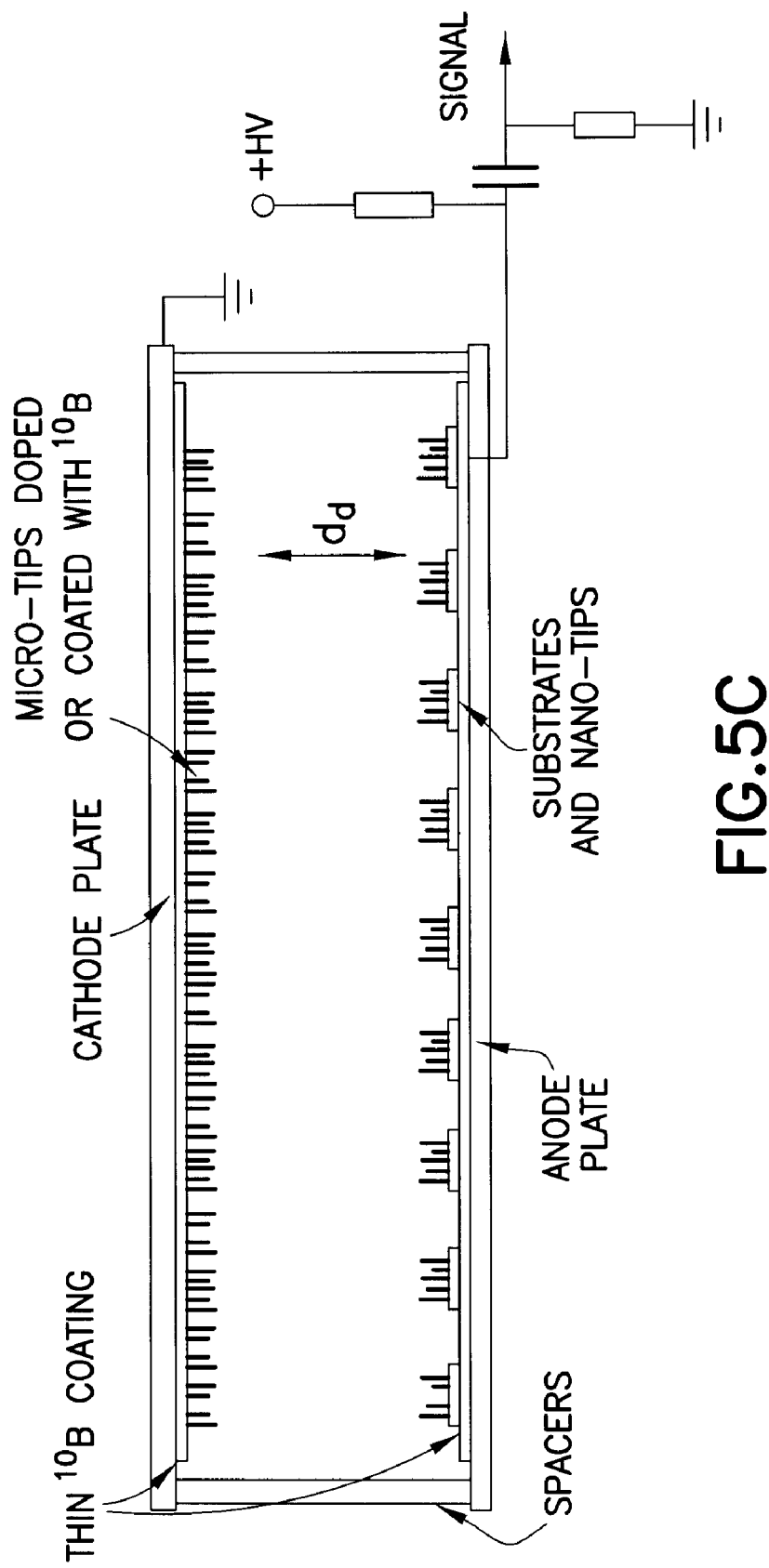
FIG. 5C illustrates another embodiment of a nano-tips based gas chamber that is a modified design from FIG. 4A, having the cathode plate structured with a micro-pattern, for example, chemically etched and densely distributed microtips, wherein the micro-tips and/or substrates are doped or coated with neutron converting materials to enhance the surface coating area or doping volume, according to some embodiments.

FIG. 5C illustrates another embodiment, wherein the chamber has the cathode plate structured in a micro-pattern, for example, chemically etched and densely distributed micro-tips. The micro-tips and substrates can now be either doped or coated with neutron converting materials, such that the micro-pattern can increase the surface area or volume of the neutron converter layer on the cathode while keeping the electric fields, so that the performance of the chamber remains intact. Here the micro-tips on the cathode are purely for coating enhancement while the nano-tips or micro-tips on the anode are used for initiating avalanches for read out. The micro-tips may be in fact of a larger scale then the nano-tips to avoid field emission at the cathode. Since the micro-pattern structure can be just micro-tips with a few µm in diameter or length, volumetric doping with a boron isotope ($^{10}$B) in the micro-tips can be engineered instead of coating. Other possible embodiments may include a bulky volume sponge-like structure on the cathode side to replace the cathode plate. The sponge-like structure if doped or coated with neutron converting materials can enhance the neutron detection efficiency.

Figure 6A:
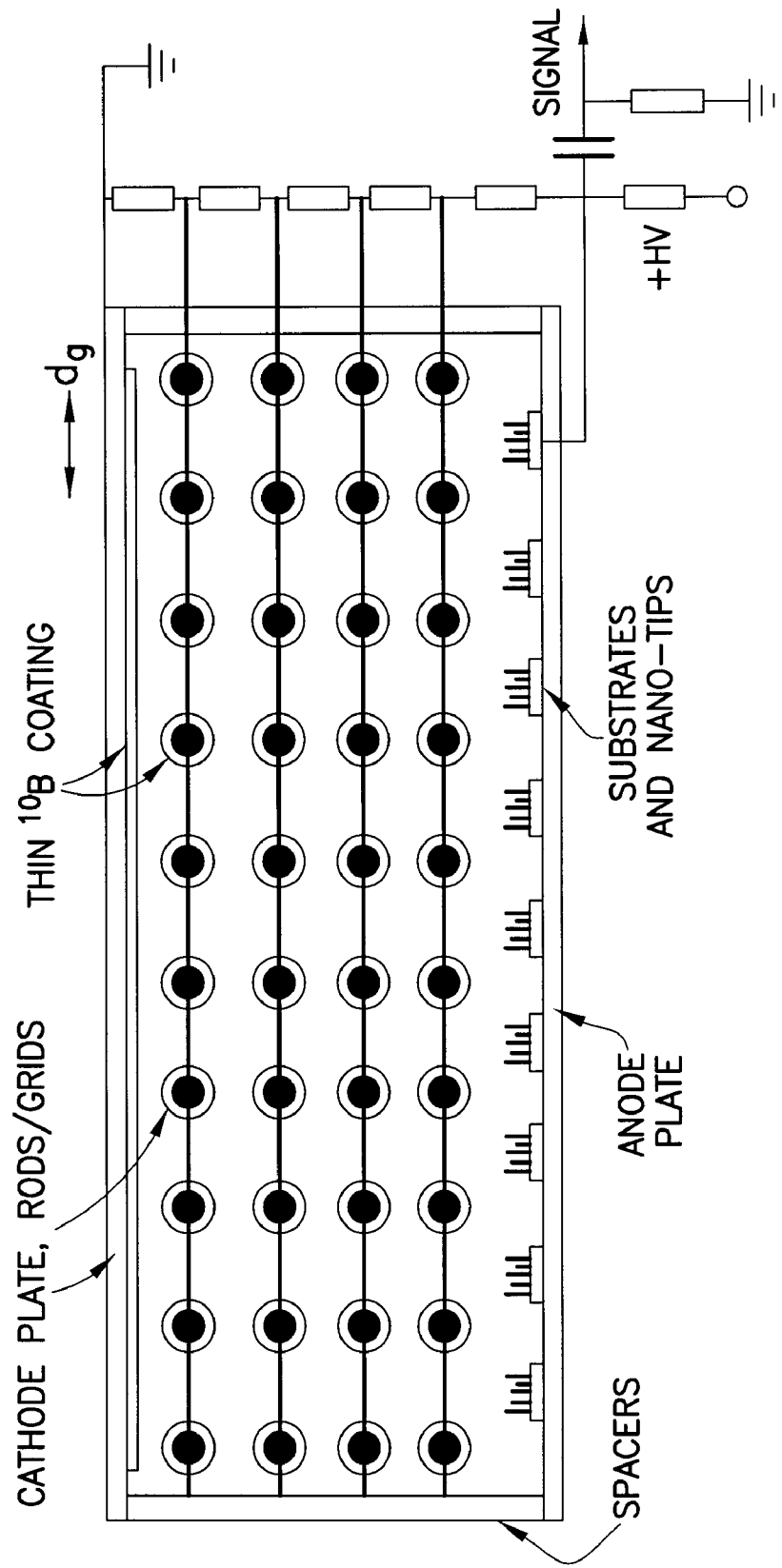
FIG. 6A illustrates another embodiment of a nano-tips based gas chamber that is a modified design from FIG. 4A, having rods, bars and/or grids positioned between the cathode plate and anode plate, biased with sequential electrical potentials and with space in between (in a dimension scale $d_g$) for electrons to drift through toward the anode plate, wherein the neutron convertor coating is on the cathode plate, the anode plate and the rods, bars and/or grids, according to some embodiments.

FIG. 6A illustrates another embodiment of a nano-tips based gas chamber that is a modified design from FIG. 4A, having rods and/or grids positioned between the cathode plate and anode plate, wherein the neutron convertor coating is on the cathode plate, the anode plate and the rods and/or grids. For example, FIG. 6A shows that it is possible to introduce a single layer or multiple layers of grids between the cathode and anode plates. The grid structure can be aligned rods, wires or micro-machined structures preferably made of metals such as Aluminium or Copper or the like. It is noted that the grid structure could be non-aligned rods. The spacing $d_g$ can be in the range from 100 µm to a few mm for example just like commonly used grids. The grid does not have to be periodical and the spacing may be only approximate $d_g$ in average over larger distances with some variability. Further, the grid structure can also be coated with a neutron converter such as $^{10}$B with approximately 1-2 µm thickness, however, it is possible the grid structure can be coated with $^{10}$B or not coated on one or more sections. Wherein, each of the grids can be supplied with a required electrical potential to create a uniform electrical field for electron-ion drifting. The purposes of multi-layered grids can be, among other things: 1) to increase the surface areas to boost the neutron detection efficiency; and 2) to decrease the number of read-out anode layers when many are packaged in a large volume. For example, the device shown in FIG. 6A has only one read-out anode layer but has roughly the same amount of $^{10}$B coating if compared to five stacked units shown in FIG. 4A. The number of grid layers and the grid spacing may be determined by experiment based on a compromise between the ease of construction, the transparency for drifting electrons and ions, and the neutron detection efficiency. For example, with a 500 µm pitch spacing between the grids and coatings of $^{10}$B with a thickness of 2 µm everywhere, the geometry shown in FIG. 6A can provide an estimated neutron detection efficiency close to that of a 20 atm $^3$He tube in a similar volume [based on the numbers of available $^{10}$B atoms versus that of $^3$He weighted by their respected neutron capture reaction cross-sections].

Figure 6B:
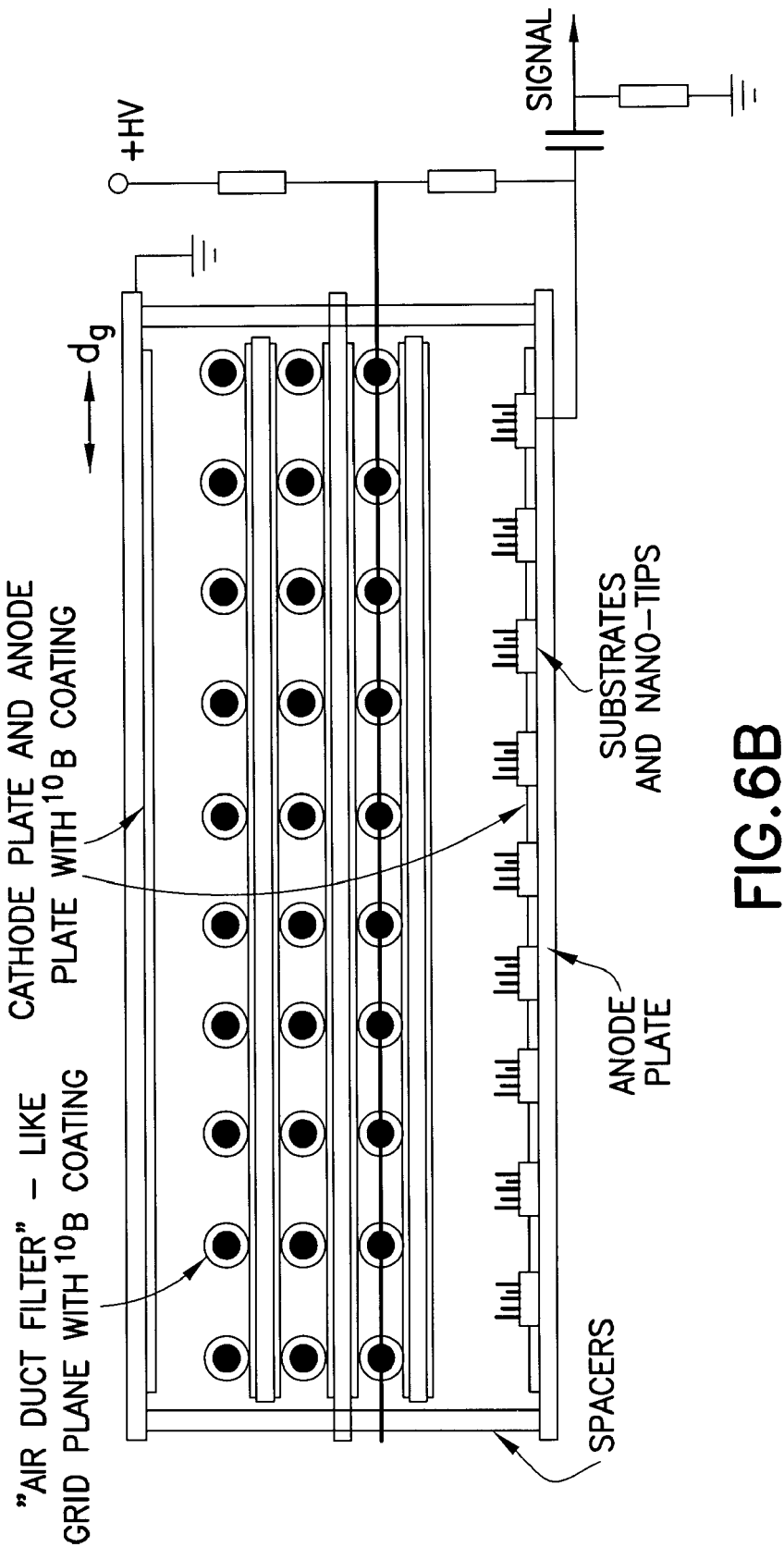
FIG. 6B illustrates another embodiment of a nano-tips based gas chamber that is a modified design from FIG. 4A, having rods, bars and/or grids positioned between the cathode plate and anode plate along with a grating or lattice structure, biased with an intermediate electrical potential and with space in between (in a dimension scale $d_g$) for electrons to drift through toward the anode plate, wherein the neutron convertor coating is on the cathode plate and anode plate, the rods, bars and/or grids assembled in a grating or lattice structure, according to some embodiments.

FIG. 6B illustrates another embodiment of a nano-tips based gas chamber that is a modified design from FIG. 4A, having rods and/or grids positioned between the cathode plate and anode plate to effectively form a lattice structure— wherein the neutron convertor coating is applied on the cathode plate, the anode plate, and the lattice structure. The lattice structure can be constructed with sufficient opening spaces and can be supplied with a required electrical potential to create an electrical field for electron-ion drifting. The spacing $d_g$ can be in the range from 100 µm to a few mm for example. The lattice does not have to be periodical and the spacing may be only approximate $d_g$ in average over larger distances with some variability. The corresponding nano-tips substrates do not need to be aligned with the lattice spacing, however, may give higher charge collection efficiency if aligned with the open spaces in the lattice. Again, the introduction of the lattice structure is to boost the available surface area for coating thus high neutron detection efficiency while limiting the number of read-out anode layers when many are packaged in a large volume.

FIG. 7 illustrates another embodiment of a gas chamber, wherein the gas chamber includes compartments that are complementing the nano-tips patterns such as in a honey-comb structure or honey-cone like 3D shaped structure that increases the surface area. Each pad of nano-tips is opposed by a thin walled 'cell' covered with the neutron converter material. The walls of the cell may be porous or may even contain holes to allow for gas flow between the cells. At least one advantage of the structure is to increase the surface area around each nano-tips pad. Another advantage includes the potential for high efficiency by stacking multiple cells. To allow applying voltage the 'cell' wall has to be made of a high resistance material. It is possible to have a gain in surface area that could be a factor 2-5 or possibly more with the efficiency for neutrons being approximately proportional to that factor. Thus, this could reduce the number of units that would need to be stacked to get to high absolute detection efficiencies. For example, to estimate that a parallel plate configuration would have about 4-5% efficiency, there would need to be a gain of a factor of 3 to 4 so as to have a unit of about 15% efficiency. Thus, we would need to stack only about 5-6 units to become comparable to a high efficiency ³He detector. It is noted that a continuous resistive coating could be applied on the walls between anode and cathode. It is also possible to adjust the voltage gradient and/or shape the angles of the walls/structure to optimize electron and ion drifting inside the "cells" and charge collection on the pads. Further, it is also possible to coat converter material on anode side.

Still referring to FIG. 7, it is possible for the electronic read-outs to be connected per cell/substrate—individual pad for a position sensitive detection. This may lead to a massive number of signal read-out channels. For a simple event counting, all or portion of the substrates can be chained together to reduce the total number of read-out channels. In this case, the substrates in principle can be narrow strips with a reasonable width and pitch for minimizing the read-out capacitance. It is also possible that another compromise could be a method, which is commonly used in a conventional wire chamber, to chain the substrates with a serpentine time delay line and the output is read out from both ends of the line. It is also possible the cathode and anode structures are separated by a region of very high resistive material. In another embodiment there may be additional features to shape the electric fields such that electrons are more efficiently accelerated towards the nano-tips (here symbolized by a gap between cathode and anode).

Figure 8:
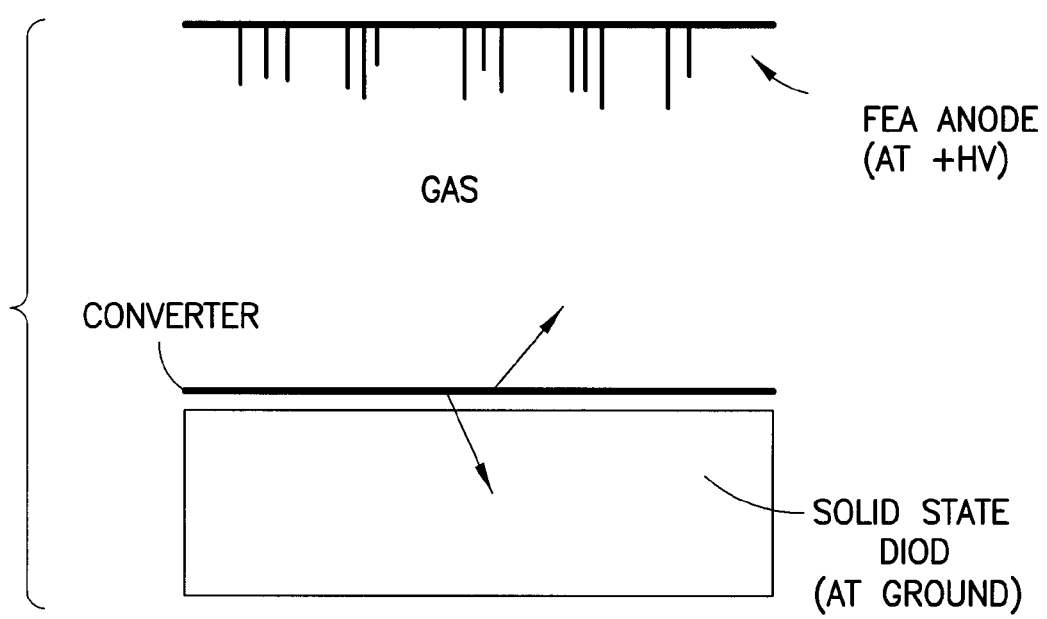
FIG. 8 illustrates another embodiment of a hybrid structure that doubles the collection efficiency of charged by-products from the neutron reactions, wherein the gas chamber has an anode wall structured with nano-tips on a pattern of the substrates while the cathode wall is formed by a converter layer coated on or backed by a solid-state diode detector, so that the thickness of the converter layer can be increased for neutron capturing efficiency due to the fact that the reaction by-products—charged particles can be collected on both sides, with such arranged electric fields in the gas chamber and inside the solid-state detector, that the performance of the gas chamber and the solid-state detector remain intact, according to some embodiments.

FIG. 8 illustrates another embodiment of a hybrid structure that doubles the collection efficiency of charged by-products from the neutron reactions, wherein the gas chamber has an anode plate structured with nano-tips on a pattern of the substrates while the cathode "plate" is formed by a converter layer coated on or backed by a solid-state diode detector, so that the thickness of the converter layer can be increased for neutron capturing efficiency due to the fact that the reaction by-products—charged particles can be collected on both sides. With proper arranged electric fields in the gas chamber and inside the solid-state detector, the performance of the gas chamber and the solid-state detector remain intact. It is noted that some of the keys to high efficiency can include: (1) sufficient converter material with high capture cross section; and (2) efficient collection of secondary charged particles. The dilemma one faces is that (1) and (2) are not compatible: for example, a self supporting thick converter increases neutron capture but a large fraction of charged particles won't be able to get out; a thin converter (may need many layers) needs backing and in effect cuts charged particle collection by half. It is possible to improve (2) noted above by coupling a semiconductor based radiation detector (e.g. a modified version of those demonstrated at the Kansas State University as described in "Perforated diode neutron detector modules fabricated from high-purity silicon", D. S. McGregor, S. L. Bellinger, D. Bruno, W. L. Dunn, W. J. McNeil, E. Patterson, B. B. Rice, J. K. Shultis, T. Unruh, Radiation Physics and Chemistry 78 (2009) 874-881) with a nano-tips based gas chamber. This basic concept can be implemented in different structures including the honeycomb, noted above in FIG. 7. It is noted that, it is possible to put two solid-state diodes back to back with a converter layer in between, which would require unique fabrication/connection/bonding issues. Most PNP or NPN structures are single sided. Thus, to fabricate a double side solid state radiation detector one will likely have to bond two wafers together with a converter layer in between. The use of a nano-tips based gas chamber on one side in a hybrid approach will resolve this issue.

Figure 9A:
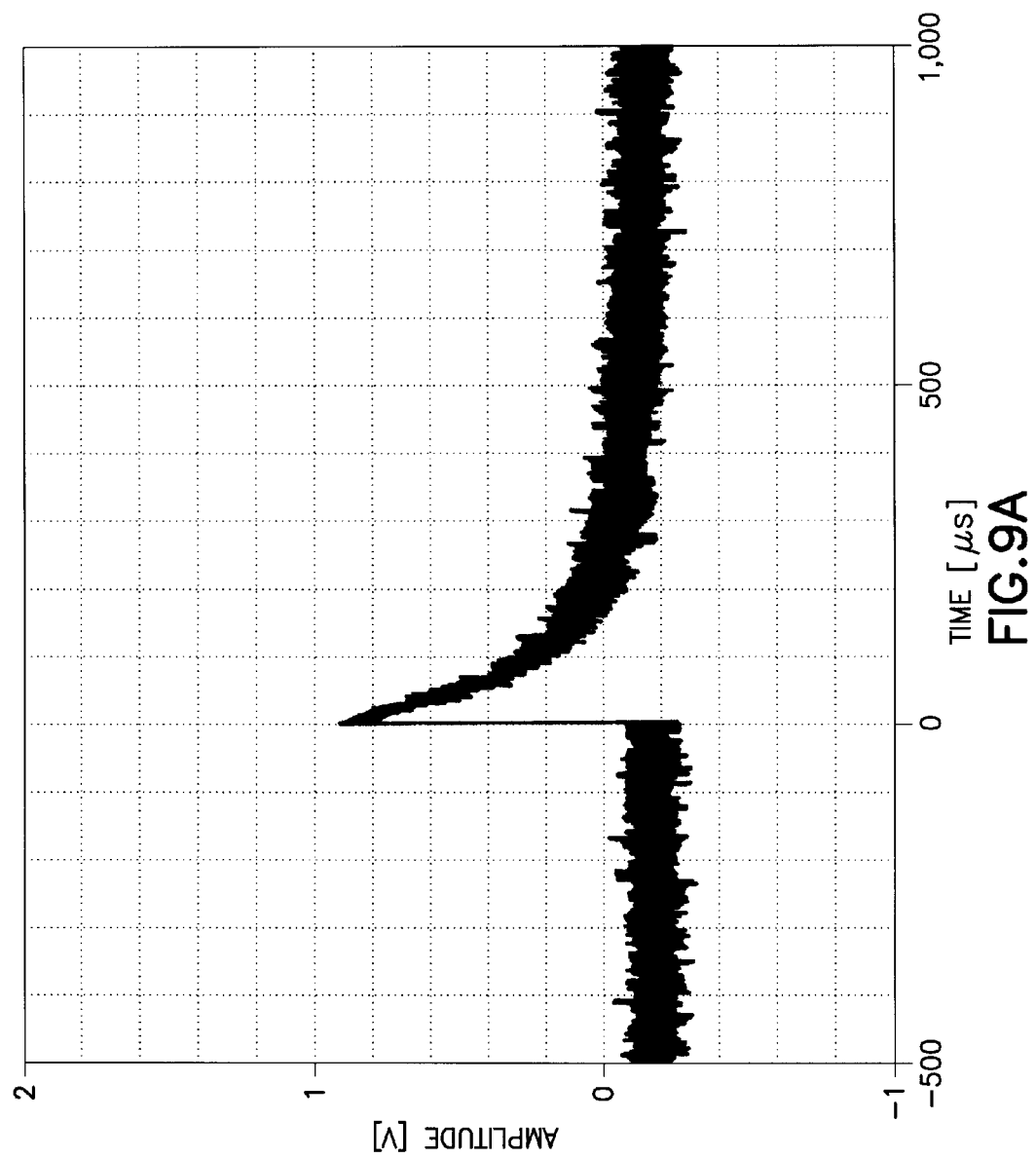
FIG. 9A shows an oscilloscope trace with a typical read-out pulse amplitude as function of time with a pre-amplifier [Ortec, model 142PC with a sensitivity of 6.5 V/pC] attached to a test gas chamber, wherein a pad of CNTs is structured on the anode plate, and a gas mixture (10% Methane, 90% Argon) is flowing through the chamber for detecting β particles from a $^{90}Sr$ source, according to some embodiments.

FIG. 9A is an oscilloscope trace showing a typical read-out pulse amplitude as function of time output from a pre-amplifier [Ortec model 142PC with a sensitivity of 6.5 V/pC and a reversed output polarity] attached to a test gas chamber, wherein a pad of CNTs is structured on the anode plate, and a gas mixture (10% Methane, 90% Argon) is flowing through the chamber for detecting β particles from a ⁹⁰Sr source. The pad is about 2 mm in diameter, and the β particles passing through the gas will give about 200 primary electron-ion pairs which can be then collected by the pad or its corresponding cathode plate. Without the amplification of avalanches, pulses with only 200 electron charge will not be detectable at the pre-amplifier output. Based on the charge sensitivity of the pre-amplifier, the avalanche amplification factor in this case is in the order of $10^4$, and the total charge collected is about $10^6$ which can be compared to FIG. 1D.

Figure 9B:
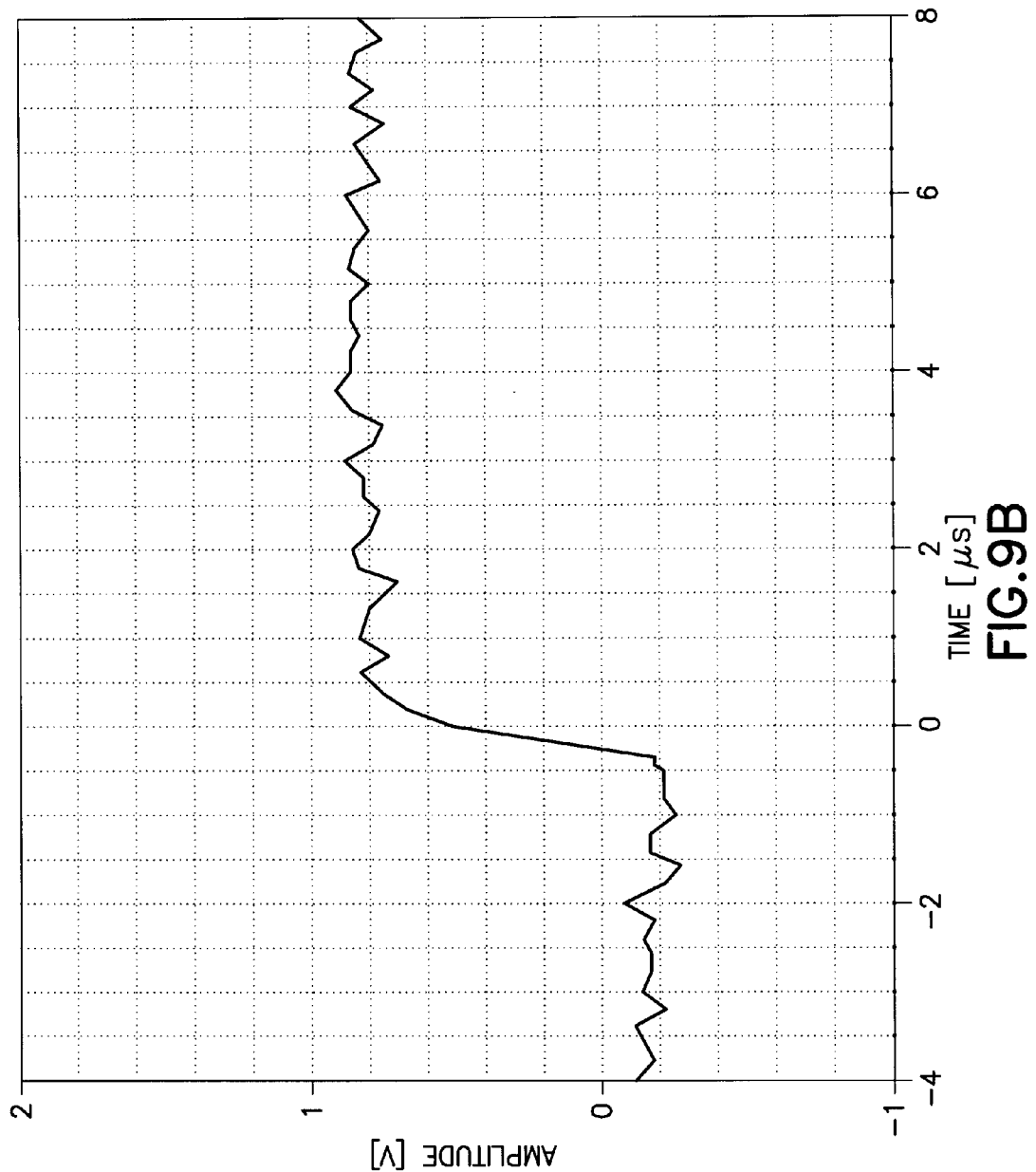
FIG. 9B is a plot illustrating the same measured β particle pulse shape of FIG. 9A with the time scale zoomed in to show the pulse rising time in the order of a fractional of 1 μs, according to some embodiments.

FIG. 9B is the same β particle pulse of FIG. 9A as seen on the oscilloscope, with a reduced time scale to show the pulse rise time being in the order of a fraction of 1 μs. This is as expected from the geometrical size of the test chamber for the β particles detection. The pulse fast rise time is also attributed to the quenching effect when Methane is added to the Argon gas so that there is no continuous cascade of events following an avalanche.

FIG. 10A is a plot to further illustrate not only the gain from avalanches but also the quenching effects of certain gas mixtures on the size of avalanches. Here, the read-out pulses from the pre-amplifier, which is attached to the test chamber, are fed to a main amplifier, and subsequent pulse heights are processed by a multi-channel pulse height analyzer (PHA). The test chamber is containing a gas mixture of argon and different percentages of methane ranging from 0% to 10% and the anode is biased with various voltages for detecting β particles from a ⁹⁰Sr source. The electric field (e.g., voltage) is selected to operate below a discharge region. The PHA output in the term of the mean channel number [mean channel number=(sum of the counts multiplied by channels) divided by (the sum of the counts)] are plotted as function of bias voltage for various gas mixtures. The channel # 100 corresponds to about 0.2 μC of charge collected, so again, the avalanche amplifications are several orders of magnitude for most of these cases.

Still referring to FIG. 10A, the quenching effects are showing by different curves with different percentage of Methane gas mixed in the Argon. Without quenching, the avalanche gain in the chamber is "quickly" approaching the Geiger-Müller mode of the operation (referring to FIG. 1D) with a relatively low voltage applied to the anode. By adding more Methane gas, relatively higher voltages are needed to achieve the similar avalanche gains and the increase in the gain is much slower. This type of characteristics is just like the conventional gas chambers.

Figure 10B:
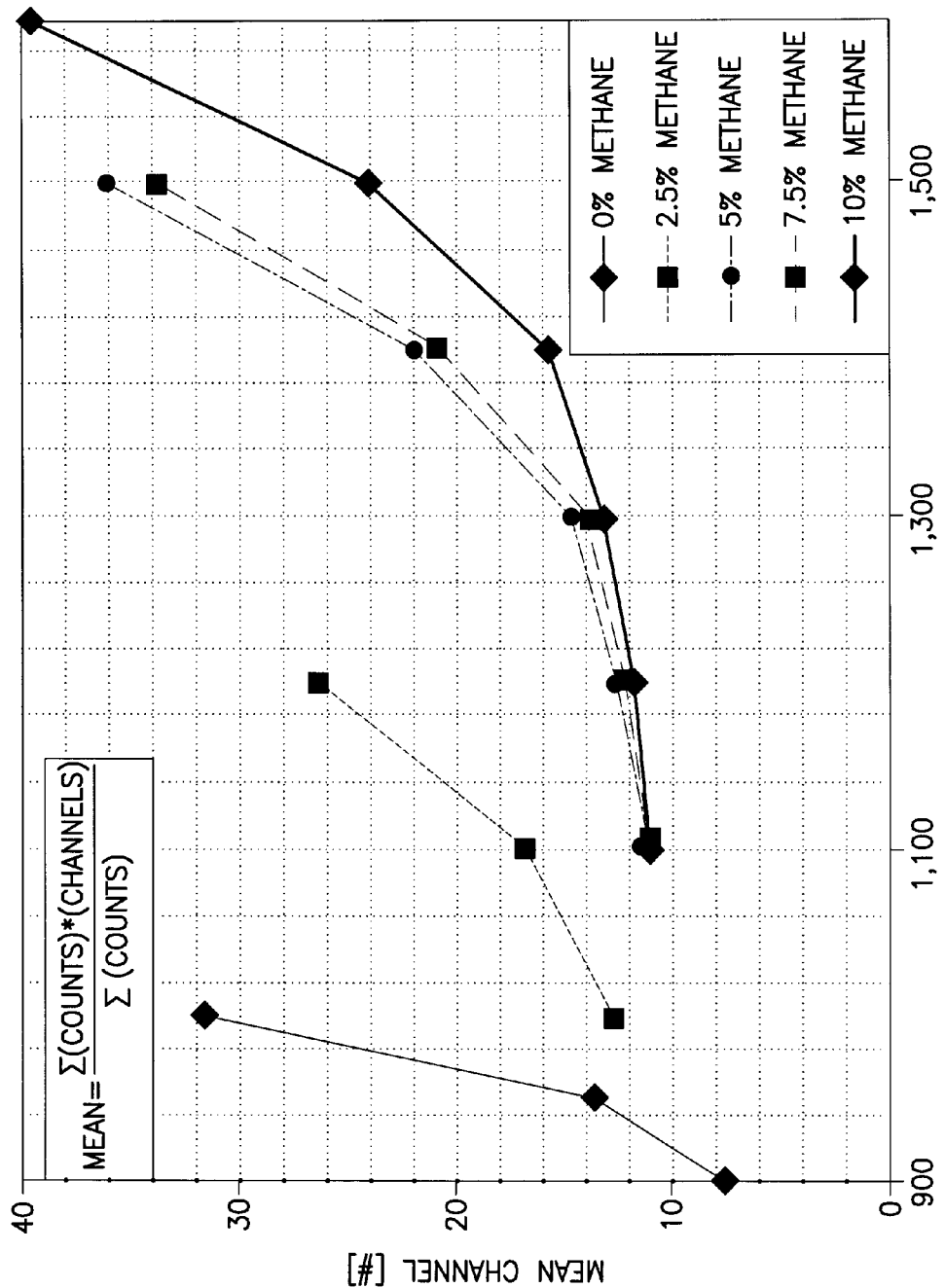
FIG. 10B is a plot illustrating the similar "quenching" effects of ployatomic gas on the size of avalanches, i.e., the read-out pulse heights as processed by a MCA, wherein the chamber is flowing with an argon gas mixed with different percentages of methane ranging from 0% to 10% and the anode is biased with various voltages for detecting a particles from a $^{241}Am$ source, according to some embodiments.

FIG. 10B is a plot illustrating the similar gains from avalanches and quenching effects of certain gas mixtures on the size of avalanches when a similar CNT-based test gas chamber is used for detecting a particles from a ²⁴¹Am source. Again, the read-out pulse heights as processed by a PHA, wherein the chamber is containing a gas mixture of argon and different percentages of methane ranging from 0% to 10% and the anode is biased with various voltages. Here different from FIG. 10A, the α-particles are "heavily ionizing" particles which can produce many more primary electron-ion pairs in the test chamber which can be collected on the anode plate outside the CNT pad area, resulting no avalanches. Due to the rudimentary design of the test CNT chamber, there are many such pure ionization events which have reasonable pulse heights as seen by the readout electronics. The PHA mean is "contaminated" by some of these events in the weighting computation equation, so that FIG. 10B cannot be directed compared with FIG. 10A, in addition to the fact that the measurements are performed with different CNT test systems. Nevertheless, the conclusions are the same: the avalanche gains are visible and over several orders of magnitude in the corresponding cases, and the characteristics of Methane gas quenching are as expected.

Figure 11:
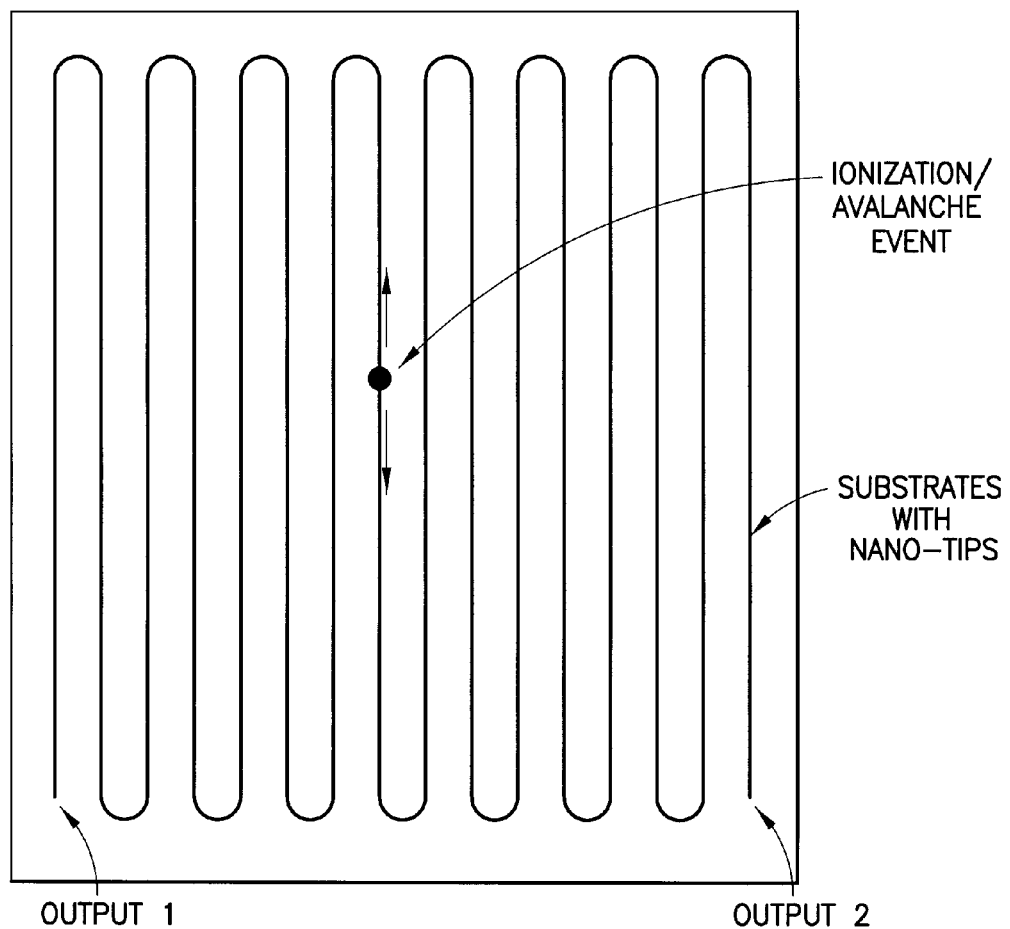
FIG. 11 illustrates another embodiment, wherein a single serpentine Time Delay Line (TDL) is used as a substrate for implementing nano-tips and one or both its ends are used to read out signals from a large area of the anode plate, instead of having a read-out for each substrate as shown in FIGS. 2A to 6B, to provide position information, according to some embodiments.

FIG. 11 illustrates another embodiment of the anode used in the nano-tips based gas chamber, wherein a single serpentine Time Delay Line (TDL) is used as a substrate for implementing nano-tips and one or both its ends are used to read out signals from a large area of the anode plate, instead of having a read-out for each substrate as shown in FIGS. 2A to 6B. In this way, all the individual substrates are chained together, and there is no need for massive number of read-out channels, while the position information can still be obtained. The induced pulse originated from ionization or avalanche charges travels in both directions along the TDL, and the position of the event is determined solely by the difference in arrival times of the two pulses at the outputs. For high-energy charged particle tracking, two such read-out delay lines can be deployed and oriented orthogonally to give position in X and Y. For oil-well logging devices which are often have a cylindrical shape, position information in one dimension along the well depth direction may be sufficient for data analysis.

Figure 12:
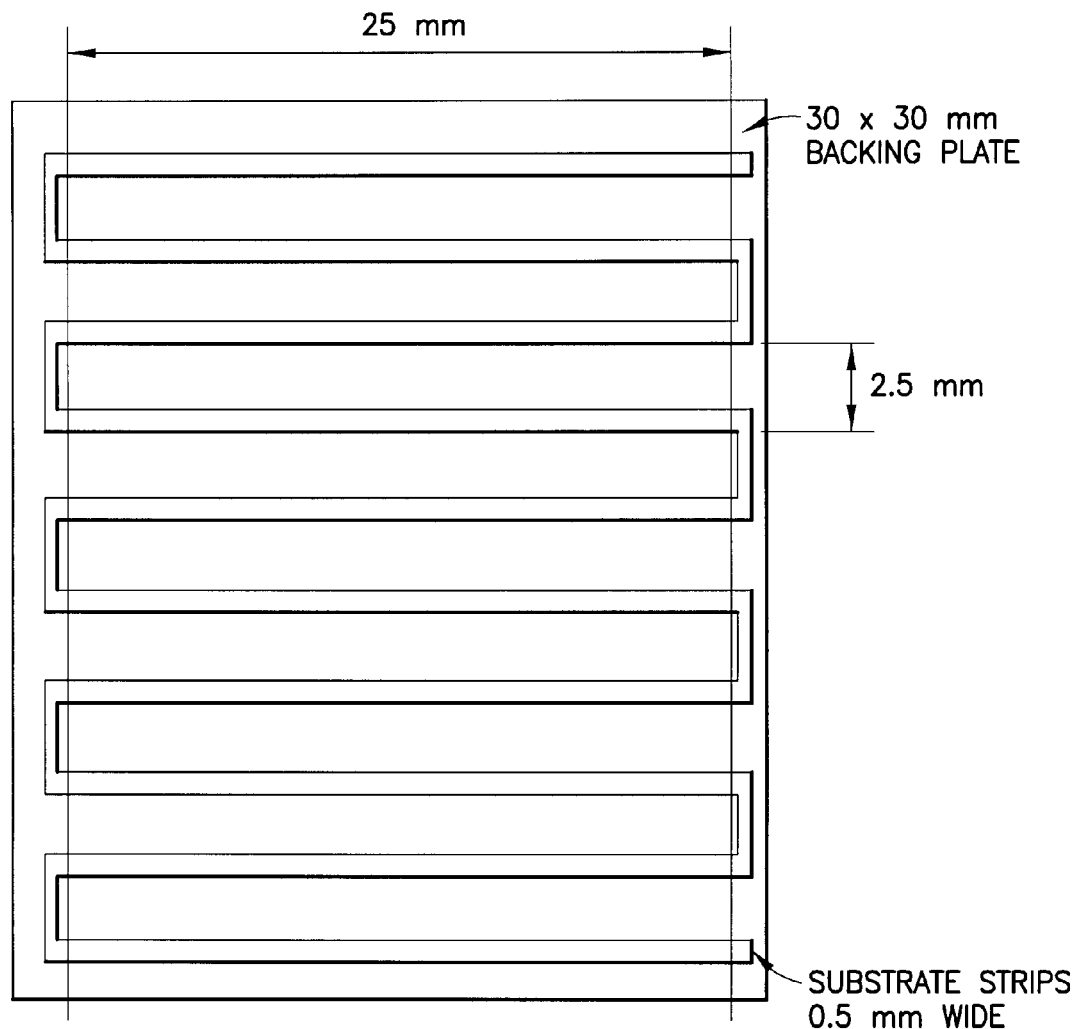
FIG. 12 illustrates another embodiment, wherein an exemplary single serpentine conductive line is given with dimensions on a square insulator plate, used as a substrate for nano-tips, not intended to introduce a time delay to extract position information, but rather to reduce the read-out capacitance, according to some embodiments.

FIG. 12 illustrates another embodiment of the anode, wherein an exemplary single serpentine conductive line is given with dimensions on a square insulator plate, used as a substrate for nano-tips, not intended to introduce a time delay to extract position information, but rather to reduce the read-out capacitance. The intrinsic capacitance of a two parallel plate system is given by the ratio of the area of conducting surface on the plate over the gap distance. Reducing the conducting surface area decreases the capacitance, and reducing the capacitance enhances the read-out pulse amplitude with the same amount of charge available produced by the ionization and avalanche processes.

Figure 13:
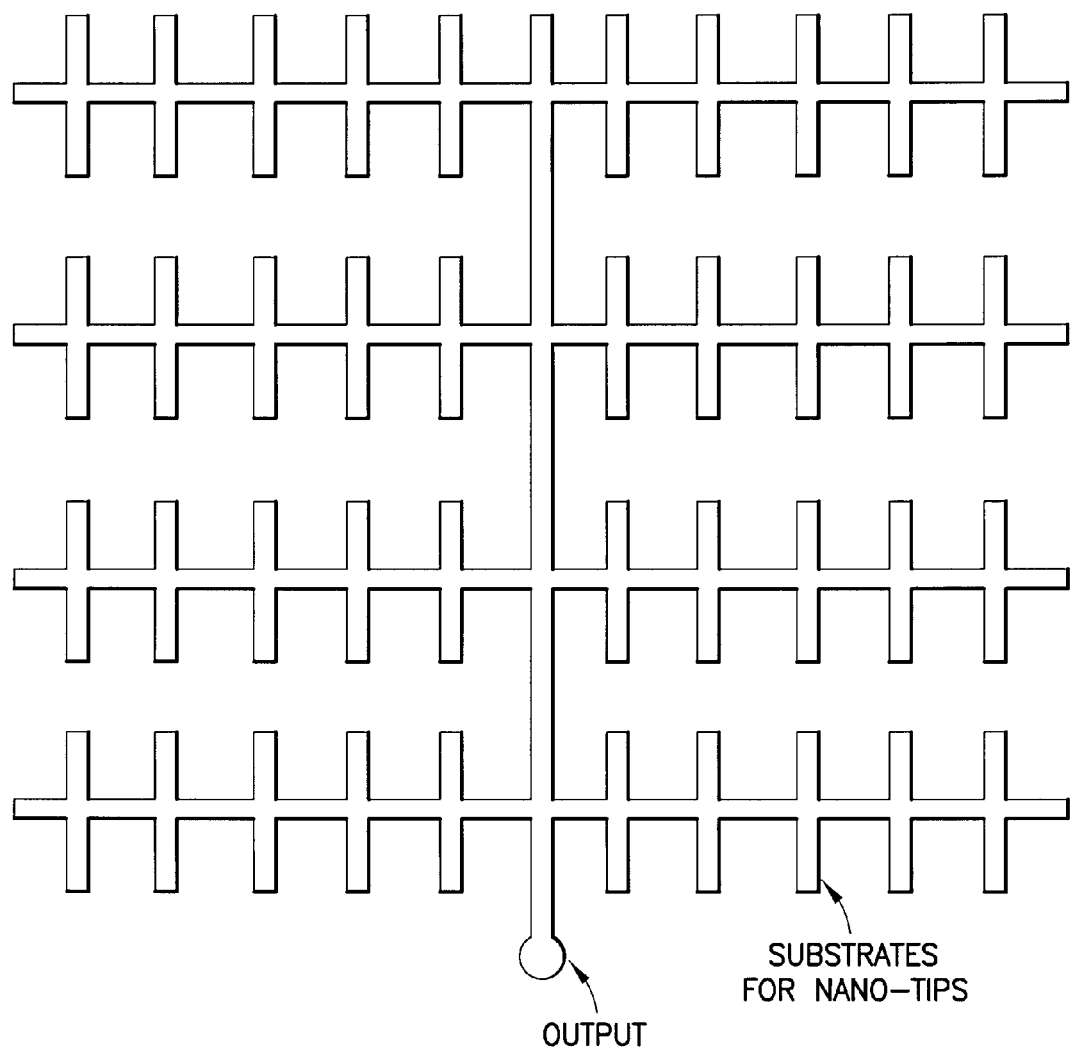
FIG. 13 illustrates another embodiment, wherein an exemplary "palm tree"-like (or similar to a spine or rib shape) conductive substrate used for nano-tips deposition, and then with only one read out, to reduce the read-out capacitance, according to some embodiments.

FIG. 13 illustrates another embodiment of the anode, wherein an exemplary tree-like shaped conductive substrate is used for nano-tips deposition, and connected with only one read out, to reduce the read-out capacitance. The spacing between the branches can be experimentally adjusted for specific application.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A radiation detector, the radiation detector comprising:
   at least one gas chamber including a cathode plate and a substrate, wherein the cathode plate and the substrate are separated by a gap;
   at least one gas disposed within the gas chamber, wherein the gas is configured to produce electrons and ions through ionization in response to at least one ionizing particle traveling through the gas chamber;
   an array of nano-tips disposed on at least a portion of the substrate to form an anode structure for attracting and collecting electrons; and
   an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
   wherein the radiation detector is configured to produce a signal based upon the electrons that are collected at the anode structure.

2. The radiation detector of claim 1, wherein the electric field is selected to generate an avalanche that produces a controlled ionization of the at least one gas to produce further electrons and ions in response to electrons that drift toward the array of nano-tips.

3. The radiation detector of claim 1, wherein the electric field is utilized to guide ions toward the cathode and electrons toward the anode.

4. The radiation detector of claim 1, wherein the electrical field is selected to amplify the number of electrons produced by the ionizing particle by a factor of 3 or more.

5. The radiation detector of claim 1, wherein the array of nano-tips is disposed over substantially an entire surface of the substrate.

6. The radiation detector of claim 1, wherein the array of nano-tips is disposed on the portion of the anode plate in a pattern, the pattern is selected from the group consisting of;
   a serpentine circuit,
   a geometric design,
   a non-geometric design,
   a uniform design,
   a non-uniform design, or
   some combination thereof.

7. The radiation detector of claim 1, wherein the array of nano-tips is selected from the group consisting of one of:
   carbon nanotubes (CNTs);
   single walled CNTs;
   multi-walled carbon nano-tubes (MWNTs);
   bundled or aligned CNTs;
   staged nano-tubes on top of MWNTs;
   shaped nano-wires;
   nano-structures such as nano-grass;
   micro-machined micro-tips from semi-conductor;
   chemically etched micro-tips from semi-conductor;
   wide-band gap materials along with metal coatings applied to the at least one gas chamber to enhance conductivity; or
   micro-tips attached with natural formed structures.

8. The radiation detector of claim 1, wherein the array of nano-tips includes a plurality of point-like structures that enhance a local electric field suitable for initiating avalanches and are positively biased. for initiating avalanches that is for field emissions that is negatively biased.

9. The radiation detector of claim 1, wherein the signal is recorded by at least one processor in communication with the at least one gas chamber and the external power source.

10. The radiation detector of claim 1, further comprising:
an electric charge measuring device in communication with the substrate and capable of monitoring an amount of electric charge that is collected at the anode structure.

11. The radiation detector of claim 1, wherein the radiation detector has a width from about 100 μm to approximately 3 meters and a length from about 2 mm to approximately 3 meters.

12. The radiation detector of claim 1, wherein the at least one gas chamber has a shape selected from the group consisting of one of:
a rectangular shape,
a cylindrical shape,
a wave-like shape, or
a fan-like shape.

13. The radiation detector of claim 1, wherein the at least one gas chamber is pressurized or depressurized.

14. The radiation detector of claim 13, wherein the pressure within the at least one gas chamber is controllable.

15. The radiation detector of claim 1, wherein the at least one gas within the gas chamber is one of a gas or a gas mixture.

16. The radiation detector of claim 1, wherein the at least one gas chamber has one or more operational regions.

17. The radiation detector of claim 16, wherein each operational region of the one or more operational regions includes one of:
at least one pressure,
at least one gas,
a gas mixture,
or some combination thereof that fills the operational region.

18. The radiation detector of claim 16, wherein the one or more operational regions includes two or more operational regions, wherein each operational region has one of;
a different pressure,
a different gas,
a different gas mixture, or
some combination thereof filling the operational region.

19. The radiation detector of claim 1, wherein the cathode plate is an electric conducting material.

20. The radiation detector of claim 1, wherein the substrate is material selected from the group consisting of one of conducting materials, non-conductive, or both.

21. The radiation detector of claim 1, wherein the gap distance between the cathode plate and the anode structure is from approximately 100 μm to approximately 10 cm.

22. The radiation detector of claim 1, wherein the cathode plate and the anode structure are separated by one or more spacer by a length from 100 μm to 10 cm.

23. The radiation detector of claim 1, the external power source generates a controlled voltage that provides for non-uniform electric field.

24. The radiation detector of claim 1, further comprising:
a gaseous neutron converter for converting a neutron into the at least one ionizing particle that travels through the at least one gas chamber, wherein the gaseous neutron converter is applied to a portion of the gas chamber.

25. The radiation detector of claim 1, further comprising:
a neutron converter for converting a neutron into the at least one ionizing particle that travels through the at least one gas chamber, wherein the neutron converter includes at least one layer of gadolinium or gadolinium isotopes with a thickness from 1 μm to 50 μm.

26. The radiation detector of claim 1, wherein at least one coating is applied to a portion of the at least one gas chamber, the at least one coating configured to convert a neutron into the at least one ionizing particle that travels through the gas chamber.

27. The radiation detector of claim 26, wherein the at least one coating is applied to a portion of the cathode plate.

28. The radiation detector of claim 26, wherein the at least one coating is applied to a portion of the anode structure.

29. The radiation detector of claim 26, wherein the radiation detector includes at least one three-dimensional structured surface, wherein the three-dimensional structured surface is selected from the group consisting of:
a periodic structure,
a lattice structure,
a structure used in catalysts, or
a structure used in air-duct filters, a honeycomb structure.

30. The radiation detector of claim 26, wherein the at least one coating includes at least one of boron or boron enriched in the boron-10 isotope ($^{10}B$), and the at least one coating has a thickness from 0.5 μm to approximately 5 μm.

31. The radiation detector of claim 26, wherein the at least one coating includes at least one of lithium or lithium ($^6Li$) isotope, and the at least one coating has a thickness from 3 μm to approximately 50 μm.

32. The radiation detector of claim 1, wherein the radiation detector determines at least one radiation property based upon the signal, the at least one radiation property includes at least one of:
detecting radiation,
detecting a location of the radiation, or
detecting a type of radiation.

33. The radiation detector of claim 1, wherein the electric field is selected to operate within at least one of an ionization region, a proportional region, or a Geiger Müller region.

34. The radiation detector of claim 33, wherein the electric field is selected to operate within a proportional region.

35. An oil and gas field application radiation detector, the oil and gas field application radiation detector comprising:
at least one gas chamber including a cathode plate and a substrate, wherein the cathode plate and the substrate are separated by a gap;
at least one gas disposed within the gas chamber, wherein the gas is configured to produce electrons and ions through ionization in response to at least one ionizing particle traveling through the gas chamber;
an array of nano-tips disposed on at least a portion of the substrate to form an anode structure for attracting and collecting electrons; and
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
wherein the oil and gas field application radiation detector is configured to produce a signal based upon the electrons that are collected at the anode structure.

36. A portable radiation detector, the portable radiation detector comprising:
at least one gas chamber including a cathode plate and a substrate, wherein the cathode plate and the substrate are separated by a gap;
at least one gas disposed within the gas chamber, wherein the gas is configured to produce electrons and ions through ionization in response to at least one ionizing particle traveling through the gas chamber;
an array of nano-tips disposed on at least a portion of the substrate to form an anode structure for attracting and collecting electrons; and
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
wherein the portable radiation detector is configured to produce a signal based upon the electrons that are collected at the anode structure.

37. A neutron radiation detector structured and arranged for operation in one of subterranean environments, wellsite environments, or downhole environments for oil and gas field applications, the neutron radiation detector comprising:
a cathode plate;
a substrate, wherein the cathode plate and the substrate are separated by a gap;
at least one gas disposed within the gas chamber, wherein the gas is configured to produce electrons and ions through ionization in response to at least one ionizing particle traveling through the gas chamber;
at least one neutron converter, wherein the neutron converter is configured to convert a neutron into the at least one ionizing particle that travels through the gas chamber;
an array of nano-tips disposed on at least a portion of the substrate to form an anode structure for attracting and collecting electrons; and
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
wherein the radiation detector is configured to produce a signal based upon the electrons that are collected at the anode structure.

38. A portable neutron radiation detector, the portable neutron radiation detector comprising:
at least one gas chamber including a cathode plate and a substrate, wherein the cathode plate and the substrate are separated by a gap;
at least one gas disposed within the gas chamber, the gas configured to ionize to produce electrons and ions in response to a charged particle traveling through the gas chamber;
at least one neutron converter for converting a neutron into the at least one charged particle that travels through the gas chamber;
an array of nano-tips disposed on at least a portion of the substrate to form an anode structure for attracting and collecting electrons; and
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
wherein the portable neutron radiation detector is configured to produce a signal based upon the electrons that are collected at the anode structure.

39. A radiation detector, the radiation detector comprising:
at least one gas chamber including a cathode plate and a substrate, the cathode plate and the substrate being separated by a gap;
at least one gas disposed within the gas chamber, the gas configured to ionize to produce electrons and ions in response to a charged particle traveling through the gas chamber;
an array of nano-tips disposed on at least a portion of the substrate to form an anode structure for attracting and collecting electrons;
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips; and
a processor configured to receive a signal based upon the electrons that are collected at the anode structure and the processor is configured to detect radiation based upon the signal.

40. A neutron radiation detector, the radiation detector comprising:
at least one gas chamber including a cathode plate and a substrate, the cathode plate and the substrate being separated by a gap;
at least one gas disposed within the gas chamber, the gas configured to ionize to produce electrons and ions in response to a charged particle traveling through the gas chamber;
at least one neutron converter for converting a neutron into the at least one charged particle that travels through the gas chamber;
an array of nano-tips disposed on at least a portion of the substrate to form an anode structure for attracting and collecting electrons; and
an external power source in communication with the cathode plate and the substrate, wherein the external power source is configured to generate an electric field near each nano-tip of the array of the nano-tips and the electric field is selected to (1) operate below a discharge region and (2) ionize the gas to produce further electrons and ions in response to electrons that drift towards the array of nano-tips;
wherein the radiation detector is configured to produce a signal based upon the electrons that are collected at the anode structure.

* * * * *